(12) United States Patent
Hofmann

(10) Patent No.: US 12,172,195 B2
(45) Date of Patent: Dec. 24, 2024

(54) CLEANING MACHINE AND METHOD FOR CLEANING LENSES

(71) Applicant: Schneider GmbH & Co. KG, Fronhausen (DE)

(72) Inventor: Klaus Hofmann, Wehrheim (DE)

(73) Assignee: Schneider GmbH & Co. KG, Fronhausen (DE)

( * ) Notice: Subject to any disclaimer, the term of this patent is extended or adjusted under 35 U.S.C. 154(b) by 0 days.

(21) Appl. No.: 17/945,516

(22) Filed: Sep. 15, 2022

(65) Prior Publication Data

US 2023/0091347 A1    Mar. 23, 2023

(30) Foreign Application Priority Data

Sep. 17, 2021    (DE) .................... 10 2021 124 091.3

(51) Int. Cl.
*B08B 3/02*    (2006.01)
(52) U.S. Cl.
CPC .......... *B08B 3/022* (2013.01); *B08B 2203/02* (2013.01)

(58) Field of Classification Search
None
See application file for complete search history.

(56) References Cited

U.S. PATENT DOCUMENTS

2006/0032521 A1    2/2006    Gehrig et al.
2018/0059411 A1    3/2018    Schneider et al.

FOREIGN PATENT DOCUMENTS

| CN | 106405876 B | 2/2019 |
| CN | 110125122 A | 8/2019 |
| CN | 112427361 A | 3/2021 |
| DE | 10353553 A1 | 6/2005 |
| DE | 60208470 T2 | 9/2006 |
| EP | 3290996 A1 | 3/2018 |

*Primary Examiner* — Rita P Adhlakha
(74) *Attorney, Agent, or Firm* — Jason H. Vick; Womble Bond Dickinson (US) LLP

(57) ABSTRACT

A cleaning machine and a method for cleaning lenses are proposed, wherein the lenses are conveyed by means of a conveying device in a conveying direction through a plurality of horizontally divided cleaning stations and are simultaneously moved back and forth parallel to the conveying direction during a cleaning process in the cleaning stations.

9 Claims, 11 Drawing Sheets

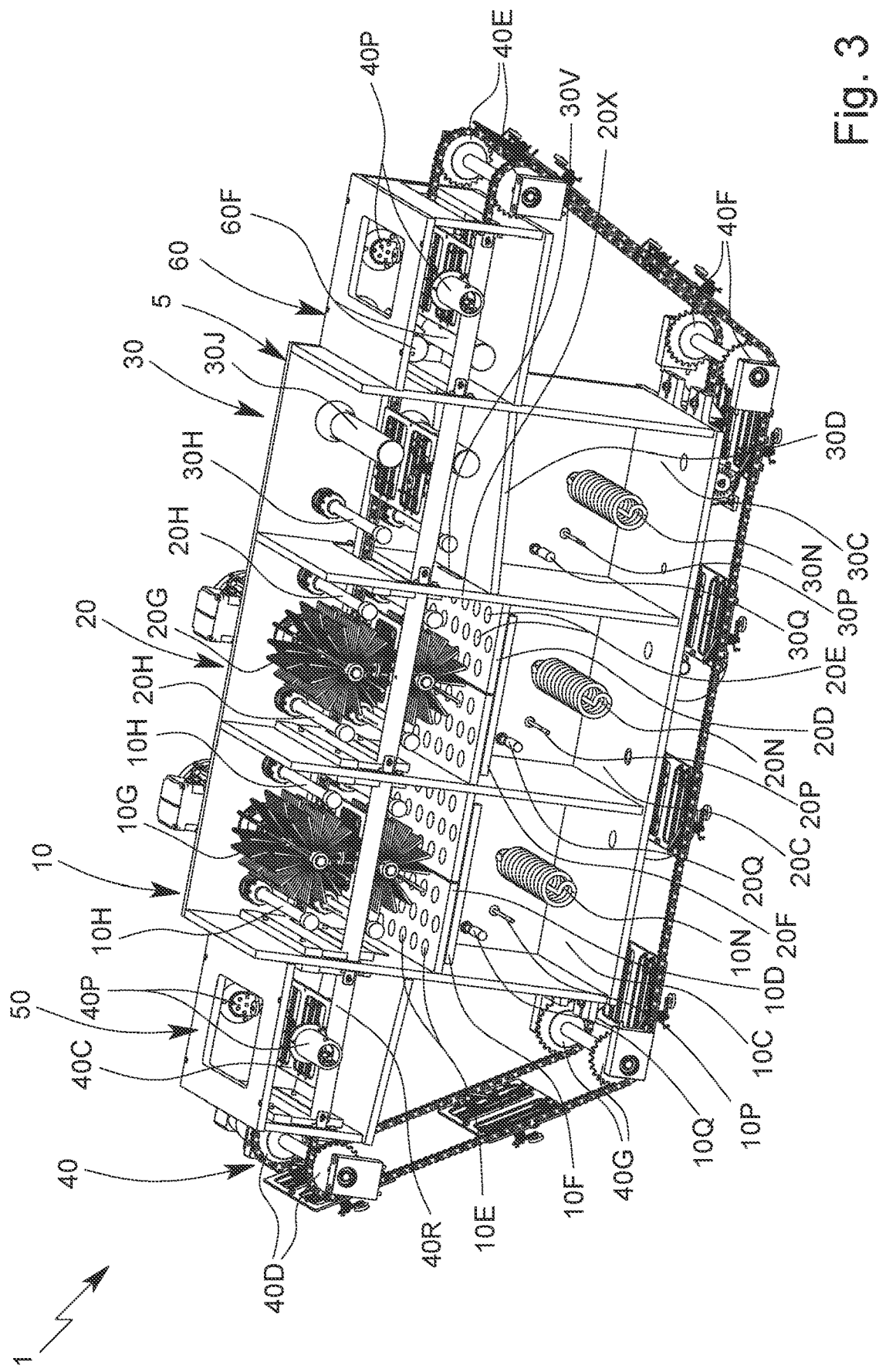

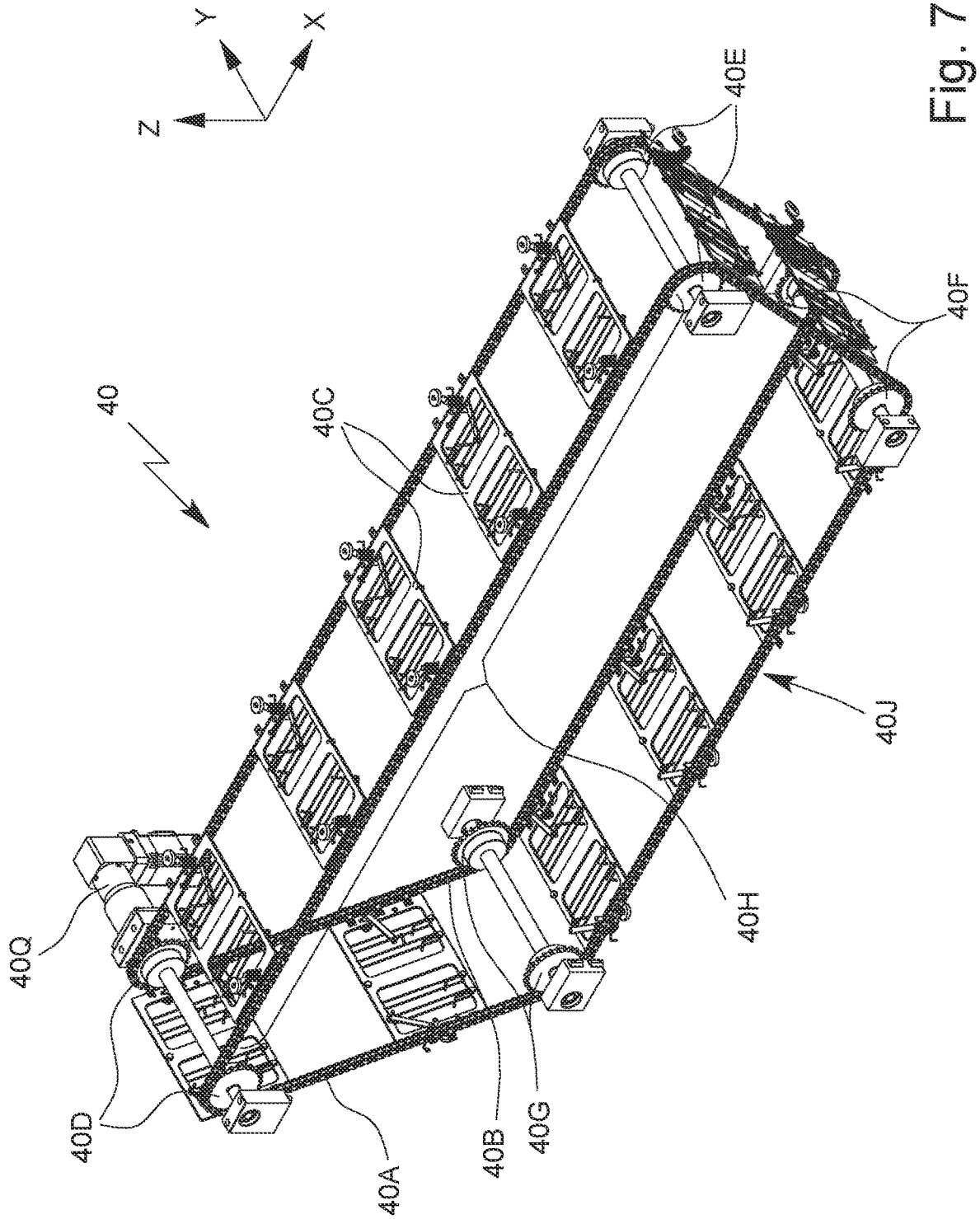

CLEANING MACHINE AND METHOD FOR CLEANING LENSES

CROSS-REFERENCE TO RELATED APPLICATIONS

This application claims the benefit under 35 U.S.C. 119(a) to German Patent Application No. 10 2021 124 091.3, filed Sep. 17, 2021, the disclosure of which is incorporated herein by reference in its entirety.

BACKGROUND

The present invention relates to a cleaning machine for cleaning a lens and to a method for cleaning a lens.

The term "cleaning" in the sense of the present invention is to be understood in particular as cleaning by mechanical treatment with a cleaning element, such as a brush, mechanical and/or chemical cleaning by use of a cleaning agent, for example by blasting, rinsing or dipping, and/or cleaning by exposure to a stream of air or gas, for example by a blower and/or for drying.

The cleaning of the lens can comprise one or more cleaning processes, in particular separated in time.

A cleaning process in the sense of the present invention is preferably a defined process, in particular in terms of time, in which cleaning is carried out by means of the cleaning station, in particular by mechanical treatment with a cleaning element, by the action of a liquid and/or by exposure to a stream of air or gas.

EP 3 290 996 A1 discloses a device and a method for cleaning a lens, wherein the lens or the carrier with the lens can be selectively fed to several cleaning devices by means of a common handling device and can be moved individually or lens-specifically during cleaning. The lens is fed to the cleaning device from above or in vertical direction, can be moved in an oscillating or circling manner during a cleaning step, and is moved back up out of the cleaning device.

DE 103 53 553 A1 discloses a system and a method for deblocking of spectacle lenses, i.e. lenses for spectacles, wherein the lenses, after separation from a block piece, are continuously guided or conveyed one after the other through several cleaning devices by means of a belt-type conveying device. The cleaning devices have separate containers and process chambers. Cleaning can be performed by brushing, spraying and dipping the lenses. The lenses are preferably clamped on grid-like supports. The equipment is relatively large and does not permit optimum cleaning.

SUMMARY

Object of the present invention is to provide an improved cleaning machine and an improved method for cleaning a lens, preferably wherein intensive and/or thorough cleaning with a high throughput and/or a simple and/or compact design of the cleaning machine is enabled or supported.

The above object is solved by a cleaning machine or a method as disclosed herein.

The cleaning machine according to the proposal has at least one cleaning station for cleaning a lens and a conveying device for conveying the lens and/or a carrier with the lens.

The conveying device is preferably designed to convey the lens in a conveying direction through the cleaning stations and/or to convey the lens to the respective cleaning station from one side and to convey it out of the cleaning station from the other side.

A first aspect of the present invention is that the conveying device is configured to convey the lens through a plurality of cleaning stations successively and to move the lens back and forth simultaneously in the cleaning stations during one or each cleaning process. This allows for optimized cleaning with a simple design.

According to the first aspect, a proposed method for cleaning a lens is characterized in that the lens is conveyed through the cleaning station(s) by means of the conveying device and is moved back and forth during the cleaning process in the cleaning station and/or simultaneously in the plurality of cleaning stations, i.e. temporarily, in particular by means of the conveying device. In particular, the lens is preferably moved back and forth several times, in particular at least two or three times, during the cleaning process and/or during cleaning by means of the conveying device, in particular alternately in the conveying direction and against the conveying direction.

Particularly preferably, the conveying device is designed as an endless conveyor or linear conveyor and conveys the lens through several cleaning stations. The lens is preferably moved back and forth or oscillated parallel to the conveying direction during the cleaning process in the respective cleaning station.

In this way, optimized cleaning of the lens is made possible in a simple manner, since the moving back and forth or oscillation leads to a movement of the lens relative to a cleaning element, in particular a brush, a nozzle or a blower, whereby the overall cleaning effect over the surface extension of the lens can be improved. In this way, a particularly thorough and/or intensive cleaning of the lens is made possible.

In particular, the conveying device provides centralized and simple control of the lenses to be cleaned simultaneously in the various cleaning stations. This enables optimized cleaning in the various cleaning stations with a very simple design.

It is preferably provided that the conveying speed through the cleaning station(s) can be varied centrally by means of the conveying device.

Preferably, the lens is conveyed by means of the conveying device not continuously, but discontinuously, at different conveying speeds, stepwise or in a clocked manner, in particular depending on the loading of the conveying device, the execution of the cleaning process and/or the unloading of the conveying device.

A further aspect of the present invention, which can also be implemented independently, is therefore that the conveying device is preferably designed as an endless conveyor or linear conveyor for conveying the lens successively through a number of cleaning stations, with clocked conveying and/or conveying at varying conveying speeds. With a simple design, this also permits optimized cleaning with a high throughput.

Another aspect of the present invention which can also be implemented independently is that the cleaning station has a cleaning chamber which is subdivided in particular horizontally and/or centrally, preferably in two parts, the cleaning chamber having in particular at the top a cleaning region for cleaning the lens with a cleaning agent and in particular at the bottom and/or immediately below the cleaning region a collecting area for the (used) cleaning agent. The collecting area preferably forms a catch basin and/or a reservoir for the cleaning agent. This arrangement enables a particularly simple and compact design of the cleaning station, since, for example, no separate tank for the cleaning agent is required.

It is provided that the cleaning station has an intermediate floor, preferably wherein the intermediate floor divides the cleaning chamber, in particular horizontally and/or centrally, particularly preferably into the cleaning area and the collecting area.

The intermediate floor can catch the lens if it should fall off the conveying device or a carrier during cleaning. In addition, the intermediate floor can prevent or minimize particles or foreign bodies from entering the collecting area.

The conveying device is in particular designed for transporting or conveying the lens and/or a carrier with the lens in a conveying direction, in particular a horizontal conveying direction, preferably from a feed point and/or a loading station of the cleaning machine to a delivery point and/or an unloading station of the cleaning machine. The conveying device preferably has an upper run for feeding the lens or a carrier with the lens through one or more cleaning stations to the delivery point or the unloading station, and a lower run for returning the (empty) carrier to the feed point or loading station.

The conveying device is preferably designed as a linear and/or endless conveyor, in particular a chain conveyor, and is preferably provided with several carriers for holding the lens or several lenses for cleaning. In particular, the carriers are coupled to a circulating means, such as a circulating chain strand. However, they can in principle also be detachable therefrom.

The term "upper run" is preferably understood to mean that part of the conveying device which conveys the lens from the feed point or loading station through one or more cleaning stations to the delivery point or unloading station. Preferably, the lens is conveyed in or on the upper run in the conveying direction.

The term "lower run" is preferably understood to mean that part of the conveying device which effects a return conveying of the (empty) carriers from the delivery point or unloading station to the feed point or loading station in a return conveying direction.

The upper run and the lower run of the conveying device thus form a circuit.

The conveying device, in particular the upper run of the conveying device, preferably runs or extends horizontally through the cleaning machine, in particular the cleaning area.

Preferably, the conveying device, in particular a lower run of the conveying device, runs or extends horizontally below the cleaning machine or cleaning station(s), in particular below the collecting area, and/or outside the cleaning station(s). However, it is also possible in principle for both the upper run and the lower run of the conveying device to run horizontally through the cleaning area.

The cleaning station preferably has in the cleaning area one or more cleaning elements, in particular rotatably or pivotably driven brushes for cleaning the lens, one or more nozzles for applying the cleaning agent and/or one or more blowers for drying the lens.

In the collecting area, the cleaning station preferably has a heating device, a temperature sensor and/or a filling level sensor, in particular in such a way that a predetermined amount of the cleaning agent can be kept in the collecting area, in particular in a predetermined temperature range.

It is preferred that the cleaning station has a filter device for recycling the cleaning agent and/or a pump for conveying the cleaning agent from the collecting area to the cleaning area.

Preferably, the cleaning station is designed to recycle the (used) cleaning agent from the collecting area, in particular to filter it, especially preferably by means of the filter device, and to supply the (recycled) cleaning agent directly to the cleaning area, in particular by means of the pump and the nozzles, thus in particular without using a (further) reservoir, tank, container or the like. This is conducive to a simple, compact design.

The lens is preferably picked up from a transport belt or a transport carrier, such as a transport box, by means of a handling device, optionally aligned by means of a prepositioning unit and transferred to the conveying device by means of the handling device, in particular to a carrier of the conveying device, in particular in a loading station or the feed point of the cleaning machine.

The lens is then preferably conveyed from the loading station or feed point to the cleaning station, in particular the cleaning area, by means of the conveying device. Here, the conveying speed can be varied or reduced when the lens enters the cleaning station or cleaning area and/or before the cleaning process begins.

In the cleaning area, the lens is preferably moved back and forth or oscillated horizontally and/or parallel to the conveying direction by the conveying device, in particular if the lens is initially in a (predefined) starting and/or cleaning position.

After completion of the cleaning process, the lens is preferably conveyed out of the cleaning station by means of the conveying device, in particular in the conveying direction, and optionally fed to a further cleaning station and finally to the unloading station or the delivery point.

After cleaning, the lens is released from the conveying device, in particular a carrier of the conveying device, preferably by means of a handling device, and transferred back to the transport belt or transport carrier.

Preferably, the conveying device is (temporarily) at a standstill during loading and/or unloading of the conveying device.

The aforementioned aspects, features and method steps of the present invention as well as the aspects, features and method steps of the present invention resulting from the claims and the following description can in principle be realized independently of each other, but also in any combination or sequence.

Further aspects, advantages, features and characteristics of the present invention will be apparent from the claims and the following description of a preferred embodiment with reference to the figures. It shows:

BRIEF DESCRIPTION OF THE DRAWINGS

FIG. 3 a perspective view of the cleaning machine from the front;

FIG. 7 a perspective view of a conveying device with carriers of the cleaning machine;

DETAILED DESCRIPTION

In the figures, some of which are not to scale and are merely schematic, the same reference signs are used for the same, similar or alike parts and components, with corresponding or comparable properties and advantages being achieved, even if a repeated description is omitted.

Figure 1:
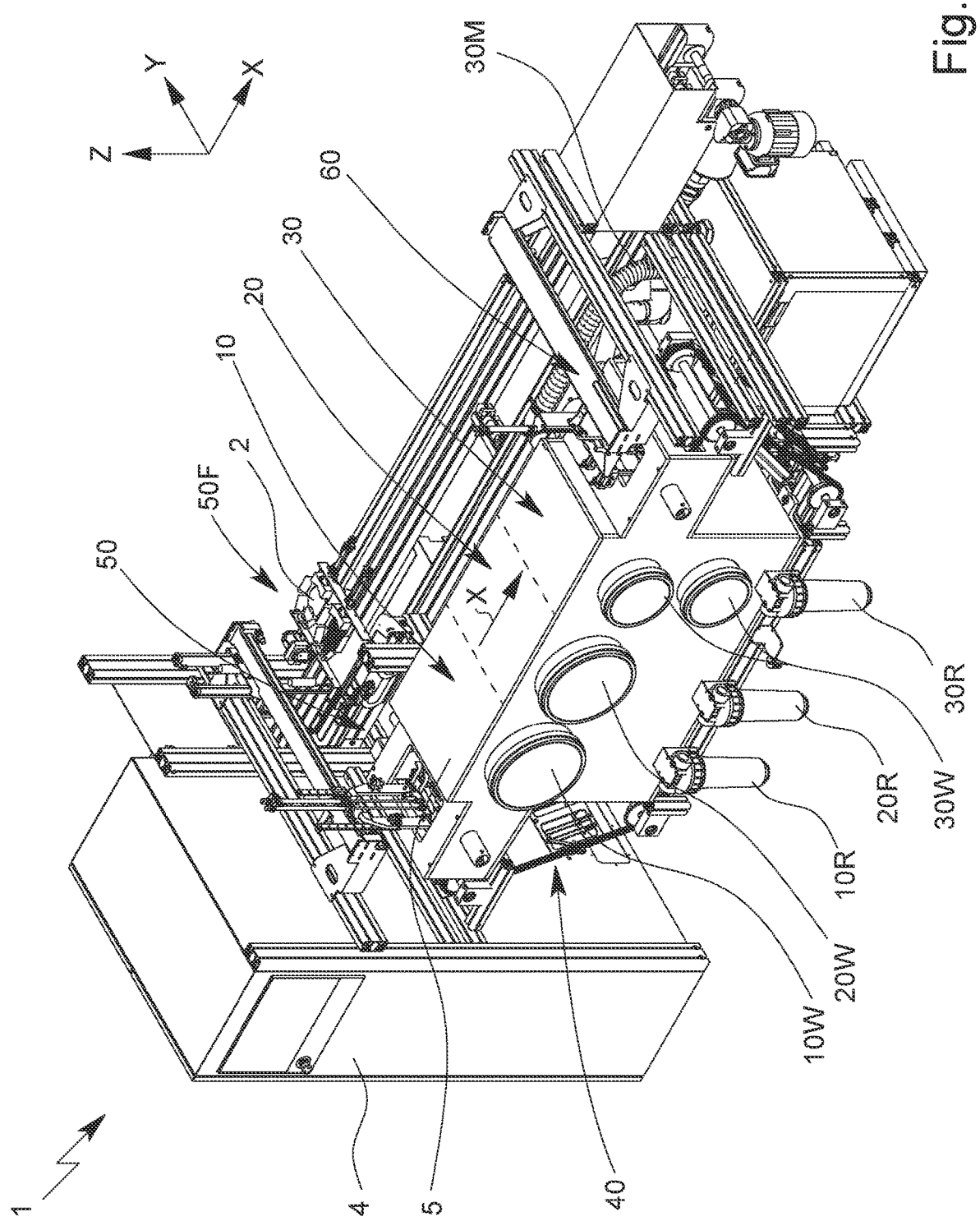
FIG. 1 a perspective view of the cleaning machine according to the proposal.

FIG. 1 shows a perspective view of a cleaning machine 1 according to the proposal, the machine being shown without outer housing.

The cleaning machine 1 is designed for cleaning a lens 2, in particular for cleaning several lenses 2 simultaneously.

The lens 2 is preferably a spectacle lens, i.e. a lens for spectacles. Accordingly, by means of the cleaning machine 1, the lenses 2 are preferably cleaned in pairs. In particular, it is possible that several pairs of lenses are cleaned simultaneously by means of the cleaning machine 1.

In the following, the cleaning machine 1 according to the proposal and/or the method according to the proposal will be explained primarily in connection with the cleaning of one lens 2, even if the cleaning machine 1 cleans or can clean several lenses 2, in particular one lens pair or several lens pairs, preferably simultaneously. In particular, the cleaning machine 1 is designed to clean several lenses 2, in particular a several pairs of lenses, successively or simultaneously, as will be explained in more detail below.

The lens 2 is preferably made of plastic. However, it is also possible that the lens 2 is made of another material, such as glass.

The lens 2 preferably has a diameter of several centimeters, in particular more than 3 cm.

The cleaning machine 1 preferably has at least one, in the illustrated example in particular three or four cleaning stations 10/20/30, a conveying device 40, a loading station 50 and/or an unloading station 60.

Figure 4:
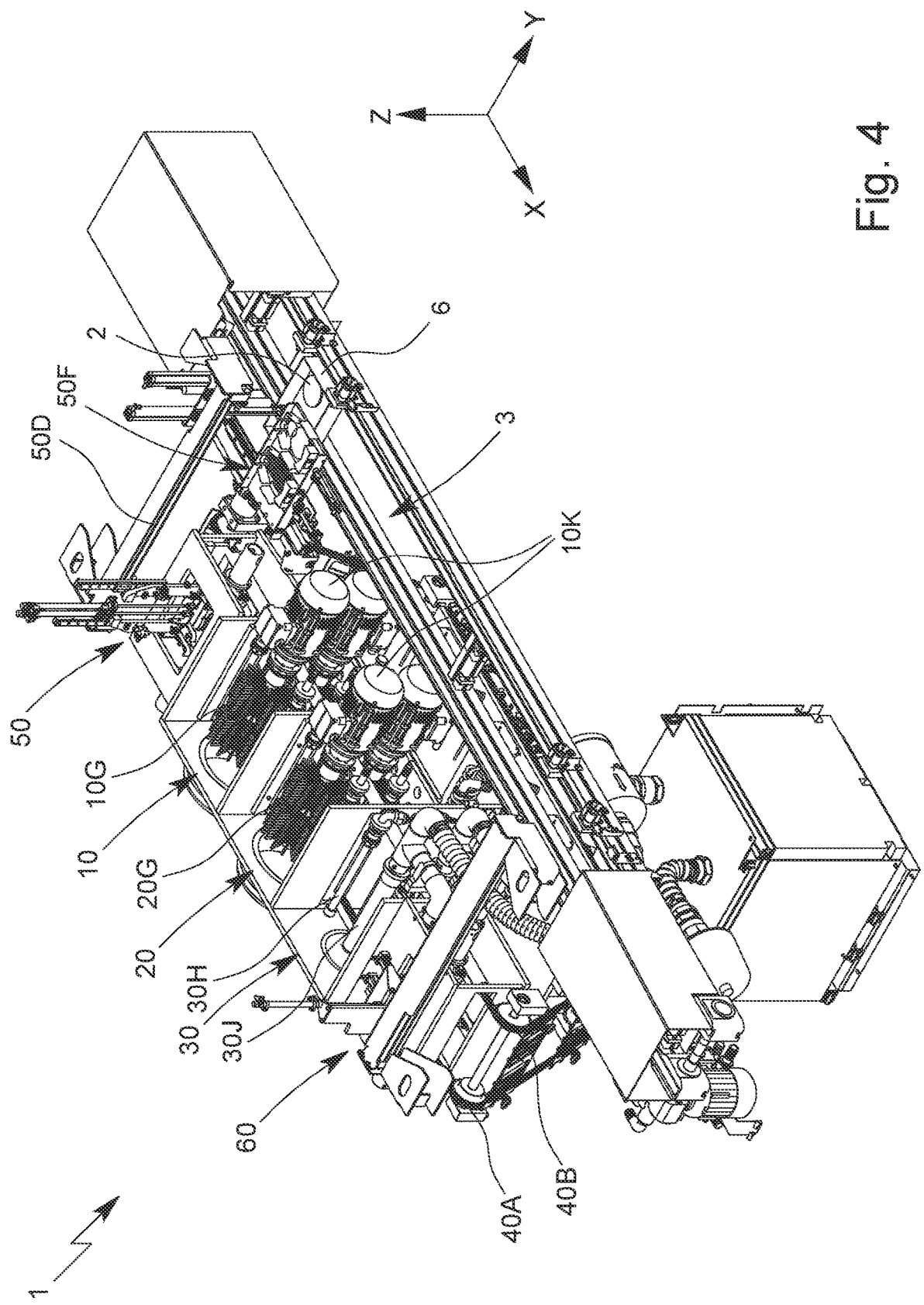
FIG. 4 a perspective view of the cleaning machine from behind.

Optionally, the cleaning machine 1 is equipped with a transport belt 3 to feed the lens 2 to the cleaning machine 1, for example after a previous processing, such as a shaping processing (for example by milling or turning), a polishing or a coating, and/or to lead the lens 2 away after cleaning. In particular, the conveying is carried out on the transport belt 3 by means of a transport carrier or a transport box 6 or the like, as indicated in FIG. 4.

The cleaning machine 1 preferably operates partially or fully automatically and preferably has a control device 4 which, according to FIG. 1, is arranged in particular on a side of the cleaning machine 1.

The cleaning machine 1 preferably has a plurality of cleaning stations 10/20/30, preferably wherein the cleaning stations 10/20/30 are arranged directly next to one another and/or one behind the other in a conveying direction X.

The cleaning stations 10/20/30 preferably serve different cleaning purposes and/or have different cleaning elements or configurations of cleaning elements. However, it is also possible that the cleaning stations 10/20/30 serve the same cleaning and/or are constructed or designed in the same way and/or are equipped with the same cleaning elements.

In the embodiment shown, the cleaning machine 1 has in particular the three cleaning stations 10/20/30, preferably wherein the first cleaning station 10 and the second cleaning station 20 are designed to be at least substantially identical in construction, but operate with different cleaning agents, and the third cleaning station 30, for example, does without brushes and in turn operates with a different or fresh cleaning agent, as will be explained in more detail below.

Individual or more aspects, advantages, features, characteristics and method steps described below only in connection with one of the cleaning stations 10/20/30 are preferably also provided for the other cleaning station(s) 10/20/30, so that corresponding explanations also apply to the other cleaning station(s) 10/20/30, even if repetition is omitted.

Each cleaning station 10/20/30 preferably has an enclosed cleaning chamber 10A/20A/30A and/or a housing 5, in particular wherein the housing 5 preferably delimits the cleaning chamber 10A/20A/30A on all sides.

Figure 2A:
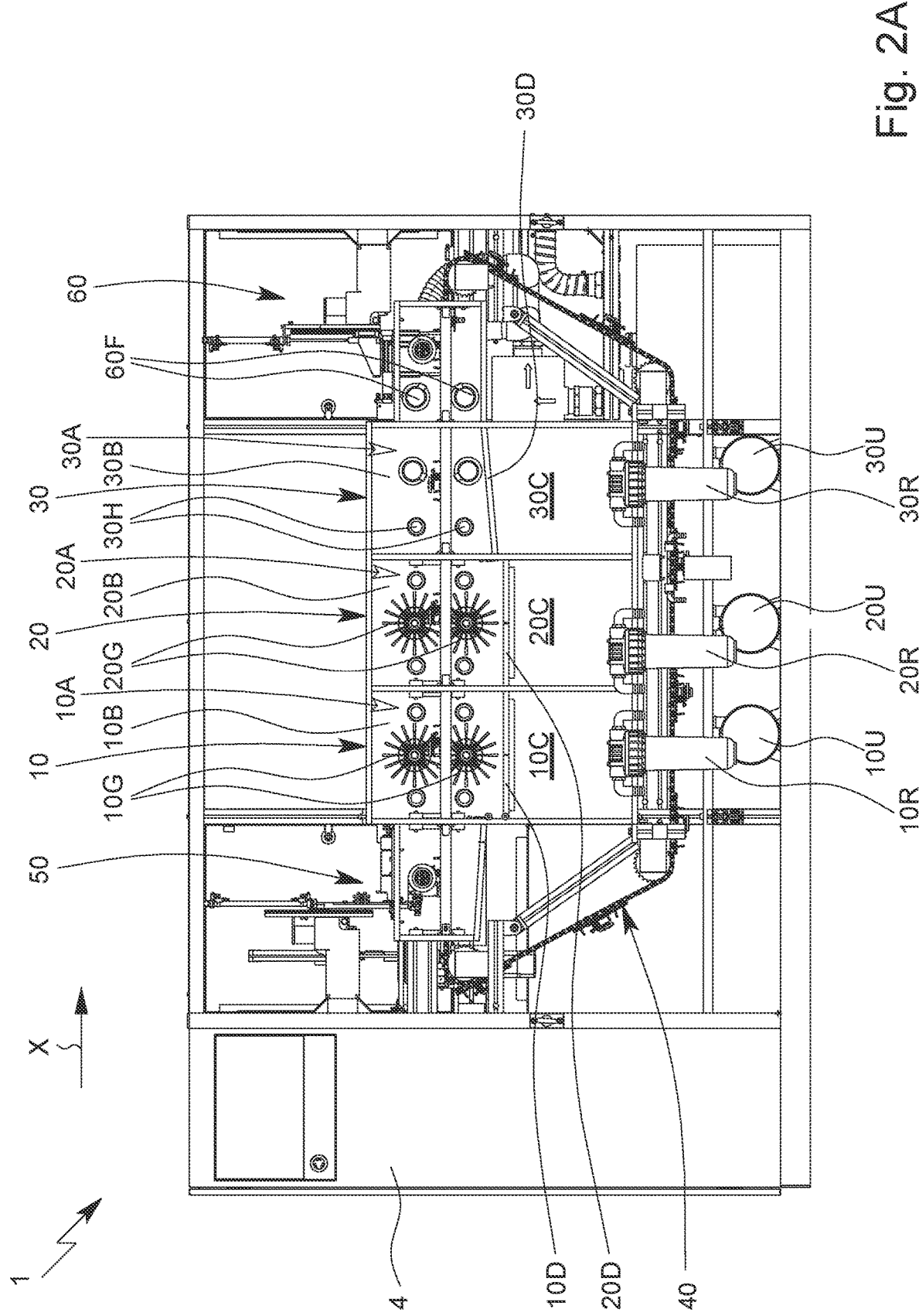
FIG. 2A a schematic front view of the cleaning machine with opened cleaning stations.
Figure 2B:
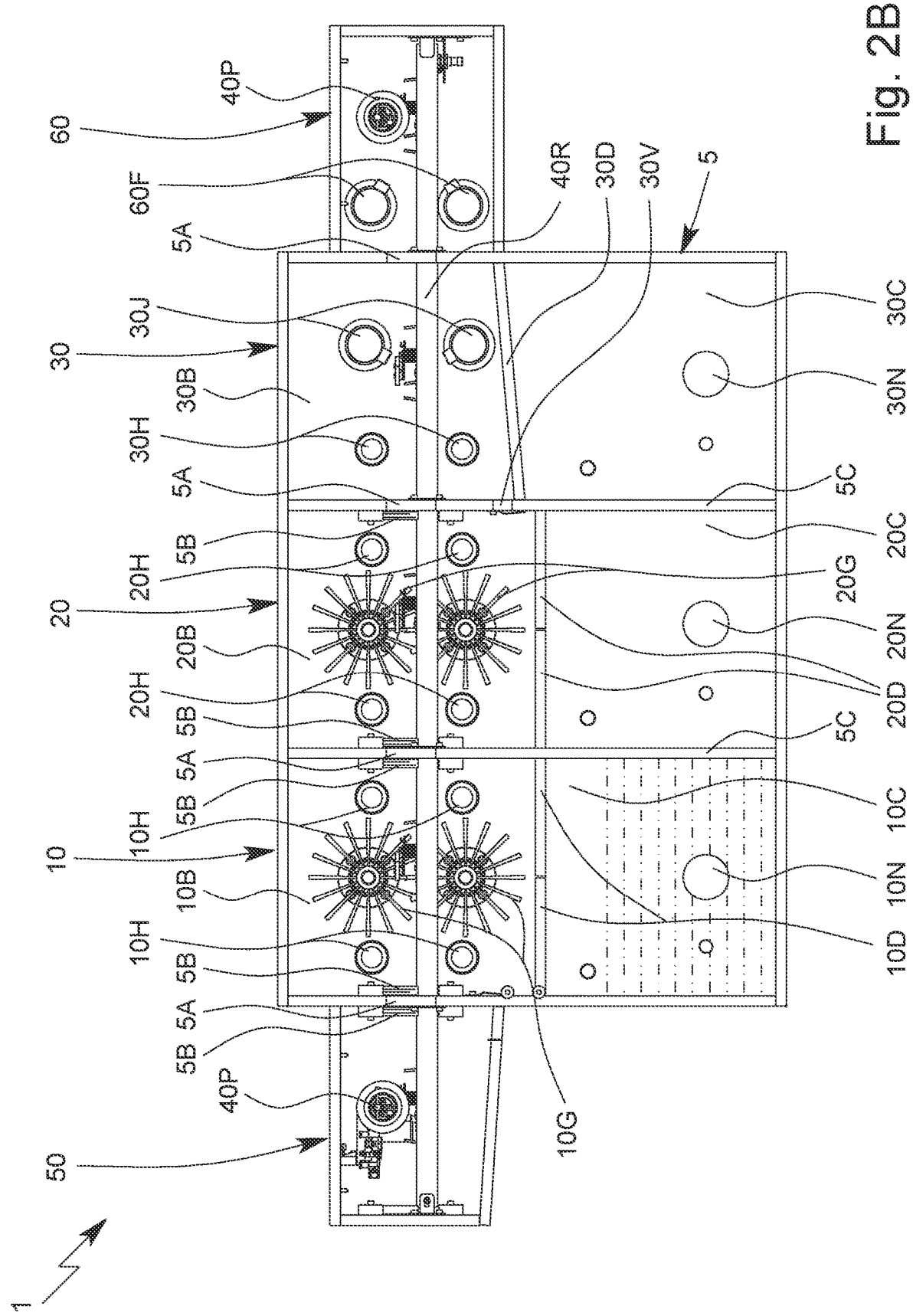
FIG. 2B a partial, enlarged magnification of FIG. 2A.

It is preferred that the cleaning stations 10/20/30 have a common housing 5, even if they preferably operate independently of each other and/or form cleaning modules and are separated from each other in particular by partitions 5C of the housing 5, as shown in FIGS. 2A and 2B. In this way, a particularly compact design is made possible or supported. However, other constructive solutions are also possible.

FIG. 2A shows a schematic front view of the cleaning machine 1, with the front part of the housing 5 not shown for illustrative purposes.

FIG. 2B is a sectional enlargement of FIG. 2A to illustrate the preferred structure in the housing 5.

FIG. 3 shows a simplified perspective view of the cleaning machine 1 from the front. In particular, the front part of the housing 5 has been omitted.

FIG. 4 shows a simplified perspective view of the cleaning machine 1 from the rear, with parts of the housing 5 not shown.

As already explained, the cleaning machine 1 preferably has a transport belt 3. In the embodiment shown, the transport belt 3 runs at least essentially parallel to the conveying direction X, as illustrated in particular by FIG. 4. However, other solutions are also possible here.

The transport of the lenses 2 to and from the cleaning machine 1 is preferably performed by means of the optional transport belt 3, wherein the lenses 2 are preferably transported in transport carriers 6, as indicated in FIG. 4.

The loading station 50, the cleaning stations 10/20/30 and the unloading station 60 are preferably arranged one behind the other in the conveying direction X, preferably wherein the conveying device 40 runs through the loading station 50, the cleaning stations 10/20/30 and the unloading station 60 and/or the lens 2 can be conveyed from the loading station 50 through the cleaning station(s) 10/20/30 to the unloading station 60 in the conveying direction X.

The loading station 50 is designed to load the conveying device 40 and/or a carrier 40C of the conveying device with a lens 2 to be cleaned, preferably a pair of lenses 2, in particular at a feed point and/or immediately before the (first) cleaning station 10.

Figure 5:
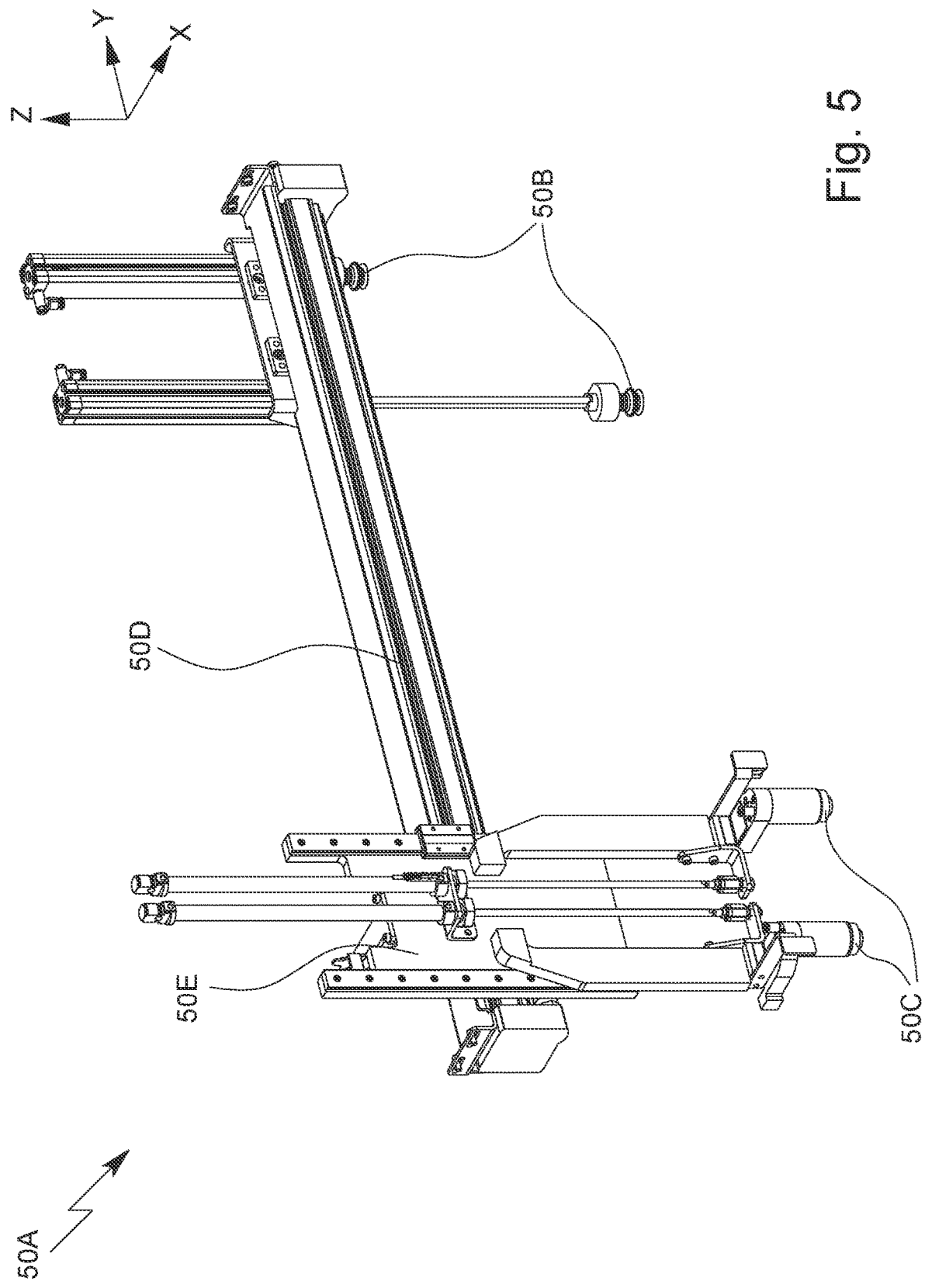
FIG. 5 a perspective view of a handling device of the cleaning machine for loading the cleaning machine.

For this purpose, the loading station 50 has a handling device 50A, preferably wherein the handling device 50A is designed to take the lens 2 from the transport belt 3 or transport carrier 6, in particular to suck it in, and to transfer it to the conveying device 40 or its carrier 40C. FIG. 5 shows a perspective view of the handling device 50A.

Preferably, the handling device 50A comprises at least one preferably pneumatic gripping device for the lens 2, in the illustrated example a first gripping device 50B and a second gripping device 50C.

The gripping devices 50B and 50C are preferably designed such that they can each handle or manipulate a pair of lenses 2. Accordingly, both the first gripping device 50B and the second gripping device 50C preferably each have two gripping elements, in particular in the form of suction cups, for picking up and/or holding lenses 2 to be manipulated, as schematically indicated in FIG. 5.

In the example shown, the two gripping elements of the first gripping device 50B can preferably be moved or traversed independently of each other in the vertical direction (Z direction). In FIG. 5, the right suction cup is raised and the left suction cup is lowered as an example. The same preferably applies to the second gripping device 50C. However, it is also possible in principle that the two gripping elements of a gripping device 50B or 50C can always only be moved together, in this case in the vertical direction or Z direction.

In the illustrative example, the two gripping devices 50B and 50C can operate independently, but are preferably controlled in a desired manner by the central control device 4.

In each case, movement is preferably carried out by pneumatic cylinders. However, other design solutions are also possible.

In the illustrated example, the first gripping device 50B and/or its gripping elements can preferably only be moved vertically or in the Z direction. In particular, they only serve to lift the lens(es) 2 from the transport carrier 6 and are accordingly preferably positioned above the transport belt 3. However, other design solutions are also possible.

Preferably, the second gripping device 50C and/or its gripping elements are likewise movable in the vertical direction or Z direction, but additionally also in the transverse direction, in particular in the horizontal direction and transversely or perpendicularly to the X direction, in this case in the Y direction, in order to be able to take over the lens(es) 2 accordingly, in particular after a prepositioning, and to transfer them to the conveying device 40 or a carrier 40C of the conveying device 40 at the feed point upstream of the first cleaning station 10.

In the example shown, the second gripping device 50C can be moved along a rail 50D in the Y direction and/or transversely to the conveying direction X and/or to the transport belt 3, in particular by means of a common carriage 50E which can be moved thereon by motor (in particular by means of a pneumatic cylinder) and which in turn holds the gripping elements which can be moved vertically or in the Z direction. However, other design solutions are also possible.

Preferably, the handling device 50A and/or its rail 50D is arranged above the transport belt 3 and/or the conveying device 40 and/or the lens 2 is removed from the transport belt 3 or transport carrier 6 from above and transferred to the conveying device 40 or carrier 40C from above.

Figure 6:
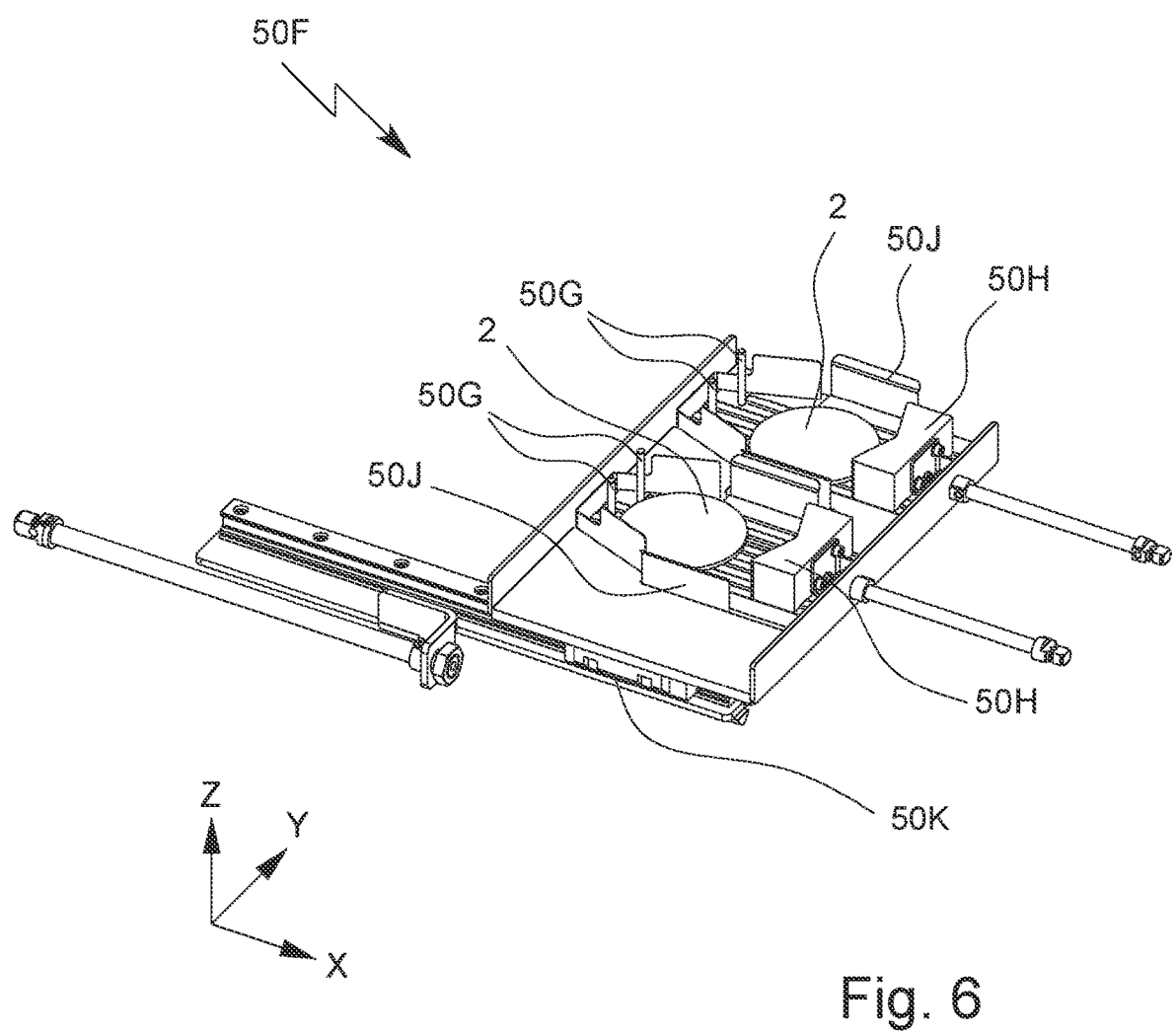
FIG. 6 a perspective view of a prepositioning unit of the cleaning machine.

Preferably, the cleaning machine 1 and/or loading station 50 has a prepositioning unit 50F. Preferably, the prepositioning unit 50F is designed to align and/or position the lens 2 for cleaning—in particular translationally and/or in the horizontal plane and/or in the X and/or Y direction. FIG. 6 shows a perspective view of the prepositioning unit 50F.

The prepositioning unit 50F is preferably arranged directly above the transport belt 3 and/or below the rail 50D, as illustrated in particular in FIGS. 1 and 4. However, other arrangements are also possible here.

The handling device 50A and/or first gripping device 50B is preferably designed to pick up the lens(es) 2 from the transport belt 3 or transport carrier 6 and to initially place them in the prepositioning unit 50F. After alignment of the lens(es) 2 in the prepositioning unit 50F, they are picked up by the handling device 50A or second gripping device 50C and transferred to the conveying device 40 or its carrier 40C.

The prepositioning unit 50F is preferably also designed for simultaneous manipulation and/or prepositioning of a lens par. In the following, a preferred structure of the prepositioning unit 50F is briefly explained, wherein only the pick-up and alignment of one lens 2 is discussed in more detail, but the corresponding components are preferably present in pairs accordingly and, accordingly, the pick-up and prepositioning of two lenses 2 can be performed simultaneously.

The prepositioning unit 50F preferably comprises a holder 50G, a jaw 50H and/or a guide 50J, preferably wherein the holder 50G and the jaw 50H are displaceable relative to each other, in particular to align the lens 2 between the holder 50G and the jaw 50H, as illustrated in FIG. 6.

In the embodiment shown, the jaw 50H is at least substantially V-shaped and/or designed like a snow plow, in particular such that the lens 2 comes into contact with two contact surfaces.

The holder 50G is preferably formed by two vertically aligned pins, which are arranged in particular symmetrically in front of the jaw 50H and/or with respect to an axis of movement of the jaw 50H.

Preferably, the jaw 50H is displaceable horizontally and/or in the X direction and/or parallel to the conveying direction X against the preferably fixed holder 50G (preferably pneumatically by means of a pneumatic cylinder), in particular in such a way that the lens 2 is aligned between the jaw 50H and the holder 50G—in this case by peripheral contact.

The guide 50J is preferably configured to laterally guide the lens 2 and/or to prevent the lens 2 from laterally falling out of the prepositioning unit 50F. In the embodiment shown, the guide 50J is formed by lateral boundaries, preferably by sheet plates.

The prepositioning unit 50F is preferably movable horizontally and/or in the X direction and/or parallel to the conveying direction X.

In this way and/or preferably, it is possible that the prepositioning unit 50F, after removal of the lens(es) 2 from the transport belt 3 or transport carrier 6, is moved underneath the latter by means of the first gripping device 50B in order to deposit the lens(es) 2 for this purpose in the prepositioning unit 50F by means of the gripping device 50B.

After pick-up and alignment, the second gripping device 50C can pick up the lens(es) 2 from the prepositioning unit 50F. For this purpose, the prepositioning unit 50F is preferably first moved away from under the first gripping device 50B, in this case in the X direction or along a corresponding carriage guide 50K or the like, to a transfer position that lies in the range of movement of the second gripping device 50C.

The preferred picking up of the lens(es) 2 from the feed conveying device or the transport belt 3/transport carrier 6 and the subsequent prepositioning, in particular by means of the separate prepositioning unit 50F, which in particular requires only a linear positioning movement in one direction, as well as the subsequent transfer of the positioned lens(es) 2 to the conveying device 40 or its carrier 40C enables a particularly simple and compact structure and also represents an independently realizable aspect of the present invention.

The prepositioning according to the proposal can also be used, if necessary, for other processing or processing equipment, such as for a coating or for a coating system or the like.

Alternatively, the prepositioning can also be realized by means of corresponding gripping elements, such as centering grippers, of the first or second gripping device 50B or 50C—i.e., without a prepositioning unit 50F, if required.

Alternatively or additionally, the prepositioning and/or alignment of the lens(es) 2 can be performed by other devices, such as a corresponding gripping element, a controlled positioning of a gripping element or the like, instead of by the prepositioning unit 50F.

Alternatively or additionally, it is also possible that the same gripping device 50B or 50C both loads the prepositioning unit 50F and unloads it after prepositioning. This allows a simplified design of the handling device 50A or the omission of a gripping device 50B/50C. Instead of two gripping devices 50B and 50C, the handling device 50A can thus perform corresponding manipulations with only one gripping device, if necessary.

The handling device 50A or second gripping device 50C particularly preferably has a suction cup as a gripping element, which adapts to the lens surface or its inclination and locks in this position during suction in order to prevent undesired tilting of the lens 2. In this way, it can be achieved that the lens 2, which rests horizontally with its rear side, is also lifted with this orientation and finally deposited on the conveying device 40 or its carrier 40C. Such suction cups are also called or designed as calotte suction cups.

The prepositioning unit 50F therefore preferably also serves a horizontal alignment of the lens(es) 2, so that it/they can be placed on the lens carrier 40C with the desired horizontal alignment.

The aforementioned horizontal alignment and pick-up or transfer of the lens(es) 2 also represents a particular aspect of the present invention that can also be implemented independently.

With regard to prepositioning, it should also be noted that due to the circumferential contact against a fixed stop, here against the two pins or the holder 50G, no centering takes place due to different lens sizes, but in this direction, here in or against the X direction, a positioning of one lens end takes place. This type of prepositioning or alignment is very easy to realize and is particularly advantageous, especially if a subsequent clamping of the lens(es) 2 against a lateral stop—here preferably on the carrier 40C of the conveying device 40—takes place.

The clamping is preferably performed in the same direction as the prepositioning, in the example shown preferably against the X direction. This also represents a particular aspect of the present invention, which can also be used or implemented independently of cleaning during other processing, such as coating or in a coating system or the like.

From the transfer position, the second gripping device 50C can then remove the lens(es) 2 from the prepositioning unit 50F and transfer it/them to the conveying device 40 or its carrier 40C. In each case, this is preferably done from above. In FIGS. 1, 4 and 5, the second gripping device 50C is shown in the position for transfer to the conveying device 40 or in the area of the feed point.

In the following, the preferred design of the conveying device 40 and the cleaning stations 10/20/30 will be explained in more detail, in particular with reference to FIGS. 2 to 4 and 7.

The conveying device 40 is designed to convey the lens 2 through the cleaning stations 10/20/30 and/or from the loading station 50 to the unloading station 60 and/or in the conveying direction X.

The conveying direction X of the conveying device 40 preferably runs horizontally, from left to right in the illustration according to FIGS. 2A and 2B.

FIG. 7 shows the conveying device 40 in a perspective view.

As illustrated in particular in FIGS. 3 and 7, the conveying device 40 is preferably designed as a linear and/or endless conveyor, in particular as a chain conveyor, in order to convey the lens(es) 2 through the cleaning stations 10/20/30. Preferably, the conveying device 40 has at least one circulating strand, in the embodiment shown two circulating chain strands 40A and 40B arranged parallel to each other. Instead of a chain, for example, a belt can also be used.

The conveying device 40 is preferably equipped with a plurality of carriers 40C for the lens 2, preferably wherein the carriers 40C are fixedly connected, in particular in a form-fitting, force-fitting and/or material-bonding manner, to the preferably circulating conveying means or strand, in this case chain strand 40A/40B, or are coupled in some other manner.

Figure 8A:
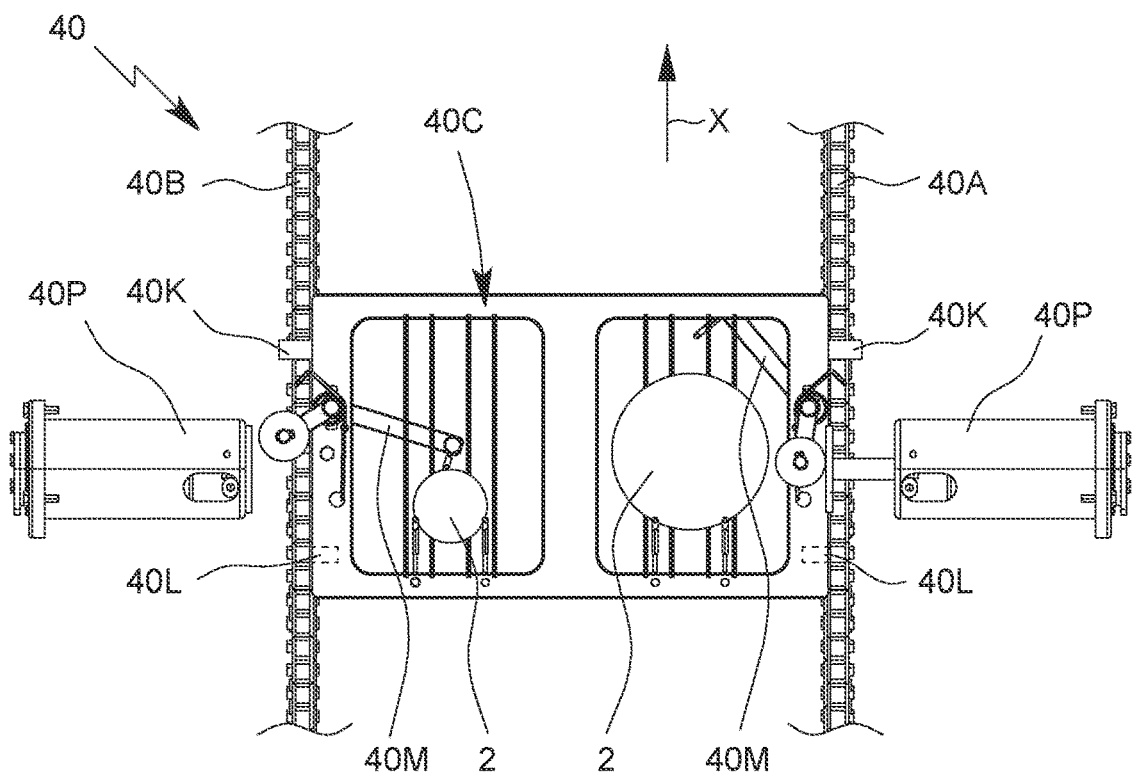
FIG. 8A a schematic top view of a carrier with associated actuators.

FIG. 8A schematically shows a carrier 40C with parts of the chain strands 40A/40B.

The carriers 40C are preferably coupled or connected once on each side to a chain strand 40A or 40B, in particular in an articulated and/or pivotable manner (cf. couplings 40K in FIG. 8A), in order to be able to follow the chain strands 40A/40B during the deflections, the chain strands 40A/40B preferably carrying corresponding holding sections 40L which hold the carriers 40C along the chain strands 40A/40B and/or in horizontal orientation, when the carriers 40C are moved from the feed point through the cleaning stations 10/20/30 to the unloading point, and/or in horizontal direction in conveying direction X. However, other design solutions are also possible.

In the following, a preferred structure of the carriers 40C is explained in more detail with reference to the perspective view of FIG. 8B.

Preferably, the carriers 40C are grid-like and/or grate-like. Preferably, the carriers 40C each have a frame, carrier bars and a holding device.

In particular, each carrier 40C is configured for supporting and/or bearing and/or clampingly holding the lens 2 or several lenses 2, particularly preferably a pair of lenses 2.

The holding device of the carrier 40C is preferably designed for clampingly holding a lens 2.

In the illustrative example, the holding device comprises a resiliently swivel-mounted swivel arm 40M that can be applied circumferentially to the lens 2 for clamping holding and preferably presses the lens 2 against two holding pins 40N, thereby clampingly securing the lens 2 to the support 40C.

Figure 8B:
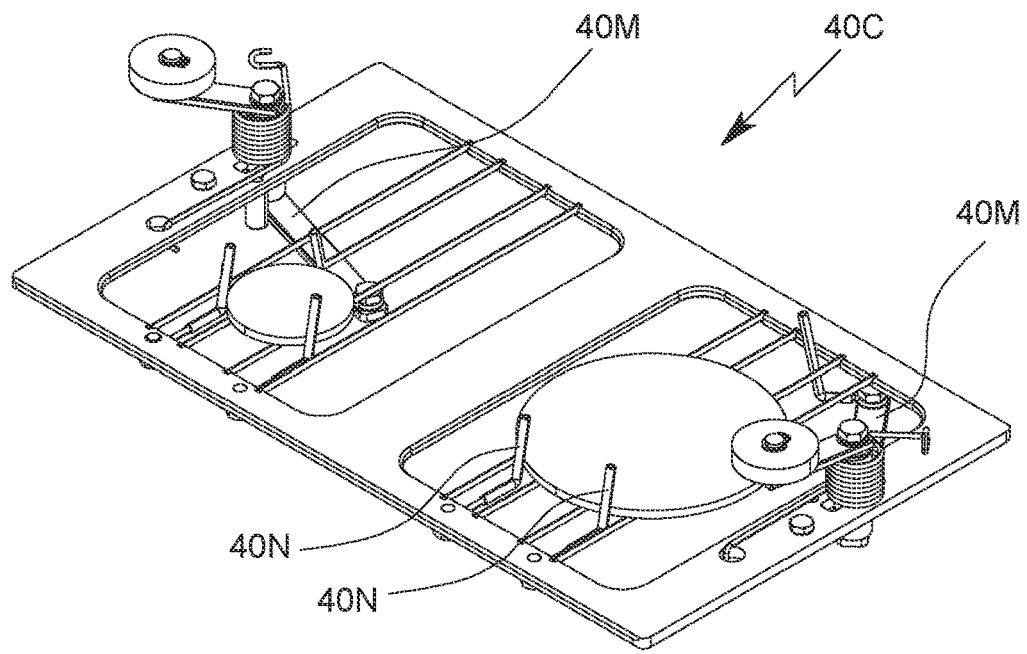
FIG. 8B a perspective view of a carrier.

FIGS. 8A and 8B show two holding devices. The lens 2 on the left side is held in a clamping manner, i.e. the swivel arm 40M rests with a contact section on the circumference of the lens 2. On the right side, the holding device or the swivel arm 40M is open. In this state, the lens 2 can be placed on the carrier 40C or picked up from the carrier 40C.

Actuators 40P are preferably used to open the holding devices or swivel arms 40M, as indicated in FIG. 8A. These are preferably arranged on opposite sides in the area of the loading station 50 or feed point and in the area of the unloading station 60 or delivery point in order to open the holding devices or swivel arms 40M as required.

The actuators 40P preferably act transversely to the conveying direction X and/or in the horizontal direction or Y direction.

The actuator 40P can act on a free end of the swivel arm 40M (in particular via a roller or the like attached to the free end) in such a way that the swivel arm 40M is swiveled into an open position and/or away from the lens 2, as indicated on the right side in FIG. 8A.

On the left side, on the other hand, the actuator 40P is retracted in the illustration example and does not act on the swing arm 40M, so that the lens 2 is clampingly held on the left side.

Normally, however, the opening of the holding devices of the respective carrier 40C takes place simultaneously, in particular from opposite sides, on the one hand at the feed point for loading the carrier 40C and at the unloading point for unloading the carrier 40C.

This enables fast and simultaneous removal of two lenses 2 during unloading and/or simultaneous loading of the carrier 40C with two lenses 2 during loading.

In the preferred embodiment, as shown in particular in FIG. 7, the conveying device 40 preferably has a drive wheel 40D, a driven wheel 40E and/or a plurality of deflection wheels 40F/40G, preferably wherein the drive wheel 40D is connected to a drive 40Q via a shaft and/or the chain strand 40A/40B is deflected and/or tensioned as desired by means of the deflection wheels 40F/40G.

The drive 40Q is designed, for example, as a stepper motor and/or preferably permits variation and/or control or feedback-control of the conveying speed, reversal of the conveying direction and/or precise or controlled positioning of the lens(es) 2.

Preferably, the conveying device 40 has an upper run 40H and a lower run 40J.

The upper run 40H preferably extends in conveying direction X from the drive wheel 40D to the driven wheel 40E. The lower run 40J preferably extends in conveying direction X from the driven wheel 40E via the deflection wheels 40F/40G to the drive wheel 40D.

Preferably, the conveying device 40, in particular the upper run 40H, runs at least substantially horizontally through the cleaning stations 10/20/30, in particular from the loading station 50 through the cleaning stations 10/20/30 to the unloading station 60.

Preferably, the lower run 40J runs outside the cleaning stations 10/20/30 and/or the housing 5, in particular below the cleaning stations 10/20/30 and/or collecting areas 10C/20C/30C. However, other solutions are also possible in which the lower run 40J runs through the cleaning stations 10/20/30.

As illustrated in particular by FIGS. 2A, 3 and 7, the conveying device 40 is at least substantially trapezoidal, in particular in the form of an isosceles trapezoid, in a side view and/or transversely to the conveying direction X, preferably with the lower run 40J forming the shorter base side and/or the upper run 40H forming the longer base side or the base of the trapezoid. In this way, the horizontal conveying distance for the lens 2 is maximized and/or a compact design of the cleaning machine 1 is made possible.

In the following, the preferred design of the cleaning stations 10/20/30 is explained in more detail, in particular with reference to FIGS. 2A, 2B and 3.

For simplicity, the preferred design of the first cleaning station 10 will be discussed in more detail first.

As already explained, the cleaning station 10 has a cleaning chamber 10A, preferably wherein the cleaning chamber 10A is largely closed and/or sealed on all sides, in particular in such a way that an escape of cleaning agent, particles or the like is prevented or minimized.

It is provided that the cleaning station 10 and/or cleaning chamber 10A is preferably horizontally divided, in particular divided in two, and/or has an (upper) cleaning area 10B and a (lower) collecting area 10C.

The cleaning area 10B is provided for cleaning the lens 2, in particular by means of a cleaning agent. The collecting area 10C is provided for collecting and/or catching the cleaning agent, as indicated by dashed lines in the collecting area 10C in FIG. 2B.

In particular, the collecting area 10C serves as both a catch basin and a reservoir for the cleaning agent.

The cleaning agent is preferably in the form of a cleaning liquid and may comprise or consist of a cleaner, a solvent and/or water, preferably deionized and/or fully demineralized water.

The cleaning area 10B is preferably arranged directly above the collecting area 10C.

Preferably, the conveying device 40, in particular the upper run 40H, runs horizontally through the cleaning area 10B. In FIGS. 2A, 2B and 3, the upper run 40H is covered by a lateral guide rail 40R and is therefore not visible.

The cleaning station 10 and/or its cleaning area 10B therefore preferably has an inlet and an outlet for the lens(es) 2 to be cleaned and/or conveying device 40, which are preferably formed by lateral, in particular slot-like openings 5A of the housing 5 on opposite sides (cf. FIG. 2B).

It is preferred that the openings 5A are provided with brushes and/or a brush seal 5B and/or can be closed in some other way, in particular to prevent or at least minimize leakage and/or carryover of cleaning agent or contaminants from the cleaning area 10B into adjacent areas or stations.

The cleaning station 10 preferably has an intermediate wall or floor 10D, preferably wherein the intermediate floor 10D preferably divides the cleaning chamber 10A at least substantially centrally or horizontally and/or separates the cleaning area 10B from the collecting area 10C.

Preferably, the intermediate floor 10D has at least one passage 10E. In the embodiment shown, the intermediate floor 10D is provided with a plurality of passages 10E in the form of bores.

Via the passages 10E, the cleaning agent can flow from the cleaning area 10B into the collecting area 10C.

In particular, the intermediate floor 10D is designed to catch the lens 2 should it fall off the conveying device 40 during cleaning.

Alternatively, the intermediate floor 10D can be designed as a sieve or additionally provided with a sieve, in particular to (also) filter out particles and/or contaminants.

The intermediate floor 10D is preferably removably and/or detachably fastened and/or inserted in the cleaning chamber 10A and is held and/or supported, for example, by a holder 10F, in particular a strip-like holder, as indicated in FIG. 3.

The intermediate floor 10D is preferably made of several parts. In the embodiment shown, the intermediate floor 10D has several, in this case two, wall elements which are arranged next to one another and/or can be removed individually.

As illustrated in particular in FIG. 1, the cleaning station 10 preferably has at least one maintenance opening 10W, preferably wherein the cleaning chamber 10A is accessible and/or can be maintained via the maintenance opening 10W. In particular, individual parts, such as the intermediate floor 10D, can be maintained and/or removed from the cleaning station 10 via the maintenance opening 10W, in particular without (completely) dismantling the housing 5.

The maintenance opening 10W is preferably at least substantially round or circular in shape and/or closed by means of a removable cover.

The cover of the maintenance opening 10W is preferably at least partially transparent, in particular such that the cleaning chamber 10A can be viewed from the outside without opening the cleaning station 10.

In particular, the cleaning station 10 is designed for mechanical and/or chemical cleaning of the lens 2, in particular by means of the cleaning agent.

Preferably, the cleaning chamber 10A has in the cleaning area 10B one or more cleaning elements, in particular brushes 10G, one or more nozzles 10H or other means for supplying or applying the cleaning agent and/or one or more blowers. The nozzles 10H are preferably cylindrical and/or rod-shaped nozzle sticks with nozzle openings which deliver or spray the cleaning agent transversely or radially.

The brushes 10G are preferably rotatably driven and/or at least substantially cylindrical in shape. Alternatively or additionally, the brushes 10G can also be pivotable.

Preferably, the brushes 10G, the nozzles 10H and/or the blowers are arranged in pairs and/or vertically one above the other in the cleaning area 10B, in particular in such a way that the conveying device 40, in particular the upper run 40H, runs between the brushes 10G, the nozzles 10H and/or the blowers and/or the lens 2, in particular together with the carrier 40C, is positioned or can be positioned between the brushes 10G, the nozzles 10H and/or the blowers for cleaning.

Particularly preferably, the conveying device 40, in particular the upper run 40H, and/or the path of movement of the lens 2 runs at least substantially centrally and/or equidistantly between the brushes 10G, nozzles 10H and/or blowers, which are preferably arranged in pairs, in particular in such a way that the lens 2 can be cleaned uniformly and/or with the same intensity from both sides and/or both from below and above.

The brushes 10G can selectively be operated in the same direction of rotation or in the opposite direction of rotation, in the case of opposite direction of rotation preferably in such a way that the brushes 10G slide on the lens 2 in the opposite direction to the conveying direction X.

As already explained, the brushes 10G are preferably motor-driven, in particular electrically, hydraulically or pneumatically driven, preferably by means of a corresponding brush drive 10K, as illustrated in particular in FIG. 4.

Each brush 10G can be provided with its own brush drive 10K. However, several brushes 10G—in particular two brushes 10G lying one above the other or the brushes 10K of a cleaning station 10—can also be driven by a common brush drive 10K.

The revolution speed of the brushes 10G can be controlled or feedback-controlled. In particular, the revolution speed of the brushes 10G can be adjusted as needed depending on the desired cleaning or also lens-specific.

The axes of rotation of the brushes 10G preferably run horizontally and/or transversely, in particular perpendicularly, to the conveying direction X, particularly preferably in the Y direction.

The nozzles 10H (nozzle sticks) or blowers (blower sticks) are preferably elongated, preferably with the longitudinal axes extending horizontally and/or transversely, in particular perpendicularly, to the conveying direction X.

The brushes 10G, nozzles 10H and/or blowers preferably extend in the axial direction or Y direction and/or transversely to the conveying device 40 such that one or more lenses 2 can be cleaned simultaneously.

In particular, the brushes 10G, nozzles 10H, and/or blowers extend at least substantially across the entire width of the upper run 40H.

Optionally, the orientation of the nozzles 10H and/or the blowers and/or their output direction can be adjusted—in particular electrically or manually. In particular, the nozzles 10H and/or blowers can be swiveled (electrically or manually), in particular in such a way that the lenses 2 and/or brushes 10G are optimally impacted with cleaning agent and/or an air or gas stream.

The nozzles 10H are used in particular to feed the cleaning agent.

Preferably, the nozzles 10H are oriented such that the cleaning agent is dispensed onto the brushes 10G. However, it is also possible that the nozzles 10H are additionally or alternatively aligned in such a way that the cleaning agent is dispensed directly onto the lens 2.

In the illustrative example, the cleaning station 10 preferably has a first pair of nozzles 10H to apply or spray cleaning agent to the lens 2, particularly when the lens 2 is moved into the cleaning area 10B and/or between the brushes 10G.

A second pair of nozzles 10H is used in particular to wet or spray the brushes 10G with the cleaning agent and is arranged downstream of the brushes 10G in the example shown. However, other arrangements are also possible in principle.

Alternatively or additionally, it is also possible for a pair of nozzles 10H to supply or spray cleaning agent to both the lens 2 and the brushes 10G.

The cleaning agent introduced into the cleaning area 10B can drain downward through the passage(s) 10E in the intermediate floor 10D into the collecting area 10C.

The cleaning agent is stored and/or collected in the collecting area 10C.

Preferably, the cleaning station 10 has a heating device 10N, a temperature sensor 10P and/or at least one filling level sensor 10Q in the collecting area 10C (cf. FIG. 3).

Preferably, the cleaning machine 1 and/or cleaning station 10 is designed to temper the cleaning agent in the collecting area 10C and/or to keep it within a certain temperature range.

In particular, the temperature and/or temperature range of the cleaning agent in the collecting area 10C is feedback-controlled, in particular by means of the temperature sensor 10P and the heating device 10N.

Furthermore, it is provided that the cleaning machine 1, in particular the cleaning station 10, is designed to monitor the filling level of the cleaning agent in the collecting area 10C and optionally to control or feedback-control a refilling, in particular by means of the filling level sensor 10Q.

The cleaning machine 1 and/or cleaning station 10 preferably has a filter device 10R and/or a pump 10U, preferably wherein the filter device 10R is designed to recycle and/or filter the cleaning agent, and/or the pump 10U is designed to supply the cleaning agent from the collecting area 10C via the filter device 10R and/or the nozzles 10H to the cleaning area 10B.

As already explained, the cleaning machine 1 has several, here preferably at least three, cleaning stations 10/20/30. The previous explanations, in particular with respect to the first cleaning station 10, apply in principle accordingly to the second cleaning station 20 and the third cleaning station 30, even if a repetition is omitted. In the figures, the reference signs are entered accordingly, i.e. the components and parts 10A, 10B, 10C of the first cleaning station 10 are found as corresponding components and parts 20A, 20B, 20C at the second cleaning station 20 and 30A, 30B, 30C at the third cleaning station 30, so that the previous explanations and aspects regarding structure, properties, etc. also apply accordingly to the second cleaning station 20 and third cleaning station 30, even if a repeated description is omitted.

The first cleaning station 10 is preferably provided for mechanical cleaning of the lens 2 with the addition of the cleaning agent, the cleaning agent containing in particular a cleaner and/or a solvent. The first cleaning station 10 forms the first cleaning stage or a pre-cleaning or main cleaning.

The second cleaning station 20 is preferably at least substantially identical in construction to the first cleaning station 10 and/or also has both brushes 20G and nozzles 20H, in particular a pair of brushes 20G and two pairs of nozzles 20H.

The second cleaning station 20 serves in particular for a mechanical post-cleaning of the lens 2 by brushing and/or a (first) rinsing of the lens 2 by the cleaning agent, which in this case preferably consists at least substantially only of purified and/or deionized and/or fully demineralized water.

Preferably, the first cleaning station 10 and the second cleaning station 20 serve to clean the lens 2 by means of the brushes 10G/20G and the nozzles 10H/20H, preferably wherein the first cleaning station 10 pre-cleans or main-cleans the lens 2 and the second cleaning station 20 post-cleans and/or rinses the lens 2.

Preferably, the cleaning stations 10 and 20 have separate circuits for the respective cleaning agent.

Particularly preferably, the cleaning chambers 10A/20A, in particular the first cleaning chamber 10A and the second cleaning chamber 20A, are fluidically separated from each other.

In the embodiment shown, the cleaning machine 1 has a third cleaning station 30, preferably wherein the third cleaning station 30 is arranged downstream of the first cleaning station 10 and/or the second cleaning station 20 in the conveying direction X.

The third cleaning station 30 is preferably designed for rinsing or post-rinsing and/or drying the lens 2. For this purpose, the third cleaning station 30 preferably has one or more nozzles 30H and/or one or more blowers 30J in the cleaning area 30B.

The third cleaning station 30 preferably has a pair of nozzles 30H for spraying and/or rinsing the lens 2 in the cleaning area 30B with the cleaning agent of the third cleaning station 30. Accordingly, the nozzle openings are preferably directed at the lens 2 from both sides (top and bottom).

The blowers 30J are preferably in the form of cylindrical or rod-shaped blower sticks, each having one or more blower openings for discharging transversely or radially an air flow or blower flow and preferably directing it to the lens 2.

In the illustrative example, the third cleaning station 30 preferably has a pair of blowers 30J to direct an air or blower flow from both sides (top and bottom) to the lens 2 located and/or movable therebetween. However, other constructive solutions are also possible.

The third cleaning station 30 preferably contains and/or uses deionized and/or fully demineralized water as cleaning agent in the collecting area 30C, preferably wherein the cleaning agent is conveyed by means of the pump 30U via the filter device 30R to the nozzles 30H in the cleaning area 30B of the third cleaning station 30.

In order to prevent contamination of the cleaning agent in the collecting area 30C of the third cleaning station 30, it is preferably provided that the cleaning agent cannot flow back from the cleaning area 30B into the collecting area 30C of the third cleaning station 30 after rinsing or use. For this purpose, the intermediate floor 30D of the third cleaning station 30 is impermeable. In particular, the intermediate floor 30D is fixedly installed and fluid-tight.

Preferably, the used cleaning agent is collected in the cleaning area 30B of the cleaning station 30 on the intermediate floor 30D and fed to the cleaning chamber 20A or the cleaning area 20B or collecting area 20C of the second cleaning station 20.

Preferably, the third cleaning station 30, in particular a partition 5C between the third cleaning station 30 and the second cleaning station 20, has a connecting opening 30V, so that the cleaning agent used in the third cleaning station 30 can, after use, if necessary, reach or flow off to the collecting area 20C of the adjacent or second cleaning station 20 via the cleaning area 20B and/or intermediate floor 20D, as illustrated in particular in FIG. 3.

The intermediate bottom 30D of the third cleaning station 30 is preferably inclined, in particular in such a way that the used cleaning agent flows off into the second cleaning station 20 via the connecting opening 30V.

The last cleaning station, in this case the third cleaning station 30, is followed by the unloading station 60 in the example shown.

In the example shown, the unloading station 60 preferably forms a fourth cleaning station in the region of the unloading point of the conveying device 40 or on the way thereto, in particular for drying or re-drying the lens 2. For this purpose, the unloading station 60 or fourth cleaning station is optionally provided with a blower 60F, in particular a blower pair 60F, which operates comparably to the blower 30J of the third cleaning station 30, so that the explanations in this regard apply accordingly or additionally.

The cleaning stations 10/20/30 are preferably of modular design. In particular, the cleaning machine 1 can be very easily adapted or converted to different requirements.

In particular, the cleaning machine 1 may also have or form or use more or fewer cleaning stations 10 than in the illustrative example.

In particular, the cleaning machine 1 has at least the first cleaning station 10 for cleaning the lens 2 with a cleaning agent, the second cleaning station 20 for pre-rinsing the lens 2, and the third cleaning station 30 for clear-rinsing the lens 2.

For example, according to an embodiment not shown, an additional cleaning station corresponding to the first cleaning station 10 can be arranged upstream of the second cleaning station 20 for (first) rinsing or pre-rinsing. The first cleaning station 10 then preferably operates with a first cleaning agent and the additional cleaning station then operates with a second, different cleaning agent.

In principle, it is also possible that the cleaning stations provided or mentioned in the illustration example are doubled to increase the throughput and/or additional cleaning stations are provided for drying to increase the drying quality and/or for rinsing to reduce remaining contamination with cleaning solutions and/or impurities.

In the illustrated example, the cleaning stations 10/20/30 and optionally also the loading station 50 (in the area of the feed point onto the conveying device 40) and/or the unloading station 60 (in the area of the unloading point) preferably have the common housing 5.

In particular, the housing 5 can allow loading from above and surround the feed point laterally and/or below, for example in order to be able to collect cleaning agent potentially escaping from the first cleaning station 10 through the opening 5A and, if necessary, to direct it back into the cleaning area 10B or collecting area 10C.

In particular, the housing 5 may allow unloading from above and may surround and/or cover the unloading point from the side and/or from below.

The individual stations and/or cleaning areas are then preferably separated from one another by in particular vertical partitions 5C of the housing 5, wherein the lens 2 can be conveyed through the openings 5A in the desired manner by means of the conveying device 40 in the conveying direction X from one station to the next station.

However, it is also possible for individual or all stations to have separate housings.

Furthermore, it is also possible that the cleaning machine or the housing 5 has one or more additional cleaning stations which are only used as required and/or are only equipped with cleaning elements, such as a brush, a nozzle, a blower or the like, as required.

As already explained, the cleaning machine 1 preferably comprises an unloading station 60, in particular wherein the unloading station 60 is arranged in the conveying direction X (immediately) after the third cleaning station 30.

The unloading station 60 is preferably designed to pick up the (cleaned) lens 2 from the carrier 40C of the conveying device 40 and to transfer it (again) to the conveyor 3 or to a transport carrier 6.

In the unloading station 60 or unloading position, the clamping of the lens 2 on the carrier 40C is first opened. For this purpose, the cleaning machine 1 or conveying device 40 or unloading station 60 preferably has at least one actuator 40P, in particular one that can be actuated pneumatically, which opens the holding device or the clamping swivel arm 40M of the carrier 40C, in particular swivels it against the force of a spring, and thus releases the lens 2 that is initially held clamped by the carrier 40C, as schematically indicated on the right side in FIG. 8A.

In particular, two actuators 40P are arranged on opposite sides, as indicated in FIG. 8A. Preferably, the two actuators 40P are arranged on opposite sides of the upper run 40H and/or housing 5 in the area of the unloading station 60 or unloading position. Accordingly, two actuators 40P are also arranged in the area of the feed position.

However, other constructive solutions are also possible.

Preferably, the unloading station 60 has a handling device 60A for handling the lens(es) 2, preferably wherein the handling device 60A comprises an in particular mechanical gripping device 60B for gripping the lens(es) 2, in particular on the edge side, and/or removing it/them from the carrier 40C after opening the clamping.

Figure 9:
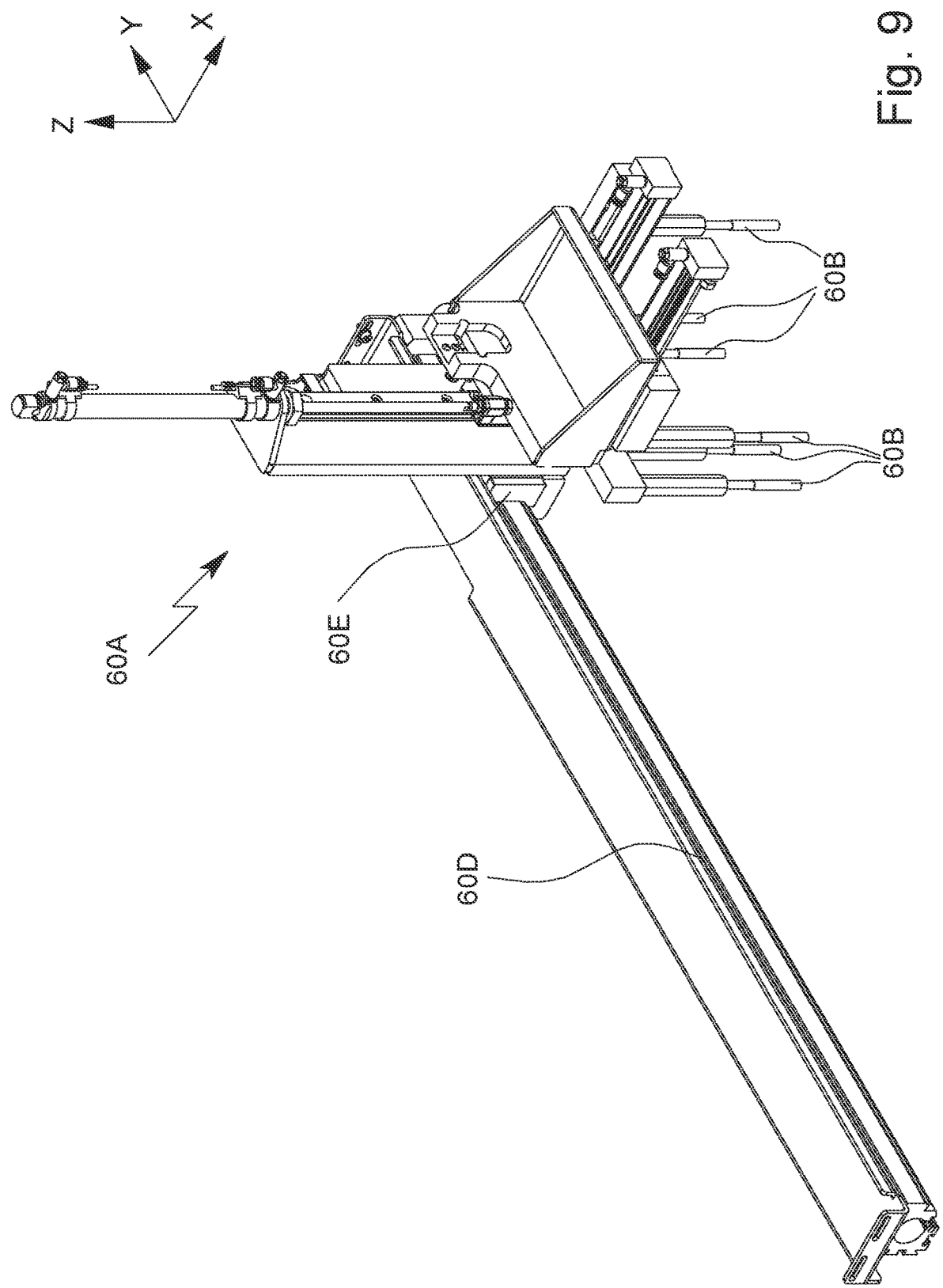
FIG. 9 a perspective view of a handling device of the cleaning machine for unloading the cleaning machine.

FIG. 9 shows a perspective view of the handling device 60A with the gripping device 60B.

In the embodiment shown, the gripping device 60B has at least one, preferably several, here two, grippers—particularly preferably multi-finger grippers—in particular in order to be able to grip several lenses 2 or a L.

In FIG. 9, the left gripper is shown in a closed state and the right gripper in an open state (one finger is moved away from the other two fingers).

The grippers preferably grip or hold the respective lens 2 circumferentially in order to prevent undesired soiling of the cleaned lens 2.

The handling device 60A preferably comprises a rail 60D and/or a carriage 60E, preferably wherein the gripping device 60B is attached to the carriage 60E and/or is displaceable along the rail 60D via the carriage 60E.

The rail 60D preferably extends transversely to the conveying direction X and/or in the Y direction and/or from the conveying device 40 to the transport belt 3.

In particular, the handling device 60A, preferably the rail 60D, is arranged above the conveying device 40 and/or the transport belt 3.

The gripping device 60B is preferably movable vertically and/or in the Z direction, in particular in such a way that the lens 2 can be gripped from above from the carrier 40C by the conveying device 40 and/or fed from above to the transport belt 3 or the transport carrier 6 located thereon.

In the following, the proposed method for cleaning the lens 2 is described in more detail, in particular with reference to FIG. 10.

The method according to the proposal is preferably carried out by means of the cleaning machine 1, in particular the cleaning stations 10/20/30, the conveying device 40, the loading station 50 and the unloading station 60.

A preferred cleaning sequence and a proposed method for cleaning or individual method steps are explained in more detail below, wherein the method steps can in principle be carried out or implemented independently of one another.

During cleaning, the lenses 2 are preferably manipulated, cleaned and the like, i.e. subjected to the respective method step, in pairs in each case. In the following, only one lens 2 is referred to for reasons of simplification. This is also possible since, for example, lenses can also be treated and cleaned individually in this way.

It should also be taken into account that the lenses 2 are usually handled, manipulated and/or cleaned on a order-by-order basis. When a lens 2 or a lens par is subjected to a cleaning step in a cleaning station, another cleaning process of another lens 2 or lens par of another order is preferably carried out simultaneously or overlapping in time in another cleaning station. Accordingly, the lenses 2 to be cleaned of different orders are also manipulated and/or cleaned simultaneously, but in different cleaning stations.

Preferably, it is provided that the lens 2 is guided or conveyed at varying conveying speeds and/or in a clocked manner through the cleaning stations 10/20/30 by means of the conveying device 40, as will be explained in more detail below.

Preferably, in a first method step, the lens 2 to be cleaned is taken from the transport belt 3 or transport carrier 6, in particular by means of the handling device 50A or first gripping device 50B.

Preferably, the gripping device 50B is moved downwards and/or in the direction of the transport belt 3/transport carrier 6 and/or in the Z direction and the lens 2 is picked up, in particular sucked in.

Subsequently, the lens 2 and/or the first gripping device 50B is moved upwards again.

As already explained, the handling device 50A, in particular the first gripping device 50B or the second gripping device 50C, and the prepositioning unit are movable relative to each other.

Preferably, after the lens 2 is lifted by the gripping device 50B, the prepositioning unit 50F is positioned below the first gripping device 50B in such a way that the lens 2 can subsequently be deposited into the prepositioning unit 50F from above.

In a further or second process step, the lens 2 is preferably aligned by means of the prepositioning unit 50F, in particular against the conveying direction X, preferably by the jaw 50H moving the lens 2 against the holder 50G of the prepositioning unit 50F. Here, the lens 2 is preferably also positioned and/or centered in the transverse direction and/or Y direction, in particular due to the V-shape of the jaw 50H and/or spacing of the pins forming the holder 50G.

Alternatively, the positioning can also be done in the opposite direction or transverse to the X direction.

After the lens 2 to be cleaned has been aligned, the prepositioning unit 50F is preferably moved horizontally and/or parallel to the conveying direction X, in particular in such a way that it lies in the movement range of the gripping device 50C.

In a further or third process step, the (prepositioned) lens 2 is picked up by the handling device 50A, in particular the gripping device 50C, from the prepositioning unit 50F and conveyed to the conveying device 40, in particular with constant (horizontal) orientation of the lens 2.

Preferably, for this purpose, the second gripping device 50C is positioned vertically above the prepositioning unit 50F by means of the carriage 50E along the rail 50D, and the second gripping device 50C is lowered to suck in the (aligned) lens 2.

Subsequently, the second gripping device 50C is moved together with the lens 2 to the conveying device 40, in particular by means of the carriage 50E and/or along the rail 50D and/or transversely to the conveying direction X.

In the feed position of the conveying device 40, which is preferably partially enclosed by the housing 5 or another housing and preferably open at the top, there is a carrier 40C of the conveying device 40. The holding device or swivel arm 40M thereof is opened in the feed position by means of the associated actuator 40P to be ready to receive the lens 2.

Thereafter, the gripping device 50C is lowered or moved vertically downward and the lens 2 is placed on a carrier 40C of the conveying device 40, preferably wherein the lens 2 is then clamped onto the carrier 40C.

Preferably, the lens 2 is fed to the first cleaning station 10 in a further or fourth method step, in particular by means of the conveying device 40.

Preferably, the lens 2 or the carrier 40C with the lens 2 is conveyed from the loading station 50 or feed position through the opening 5A and optional brush seal 5B—here even two brush seals 5B, as indicated in FIG. 2B—into the first cleaning station 10, preferably wherein the conveying speed of the conveying device 40 is reduced when the lens 2 enters the cleaning station 10 and/or before the cleaning process begins.

Optionally, the conveying speed of the conveying device 40 can be varied continuously or stepwise, in particular when the lens 2 is in a cleaning area.

It is preferably provided that the brushes 10G/20G, the nozzles 10H/20H/30H and/or the blowers 30J/60F are not permanently activated, but are only activated for the respective cleaning process.

Preferably, the pump 10U is first activated, in particular when the lens 2 or the carrier 40C with the lens 2 enters the cleaning area 10B of the first cleaning station 10, in particular in such a way that the lens 2 and/or the brush(es) 10G is/are wetted with the cleaning agent before the brush drive 10K is activated.

This prevents non-moistened brushes 10G and/or a dry lens 2 from coming into contact with each other.

Figure 10:
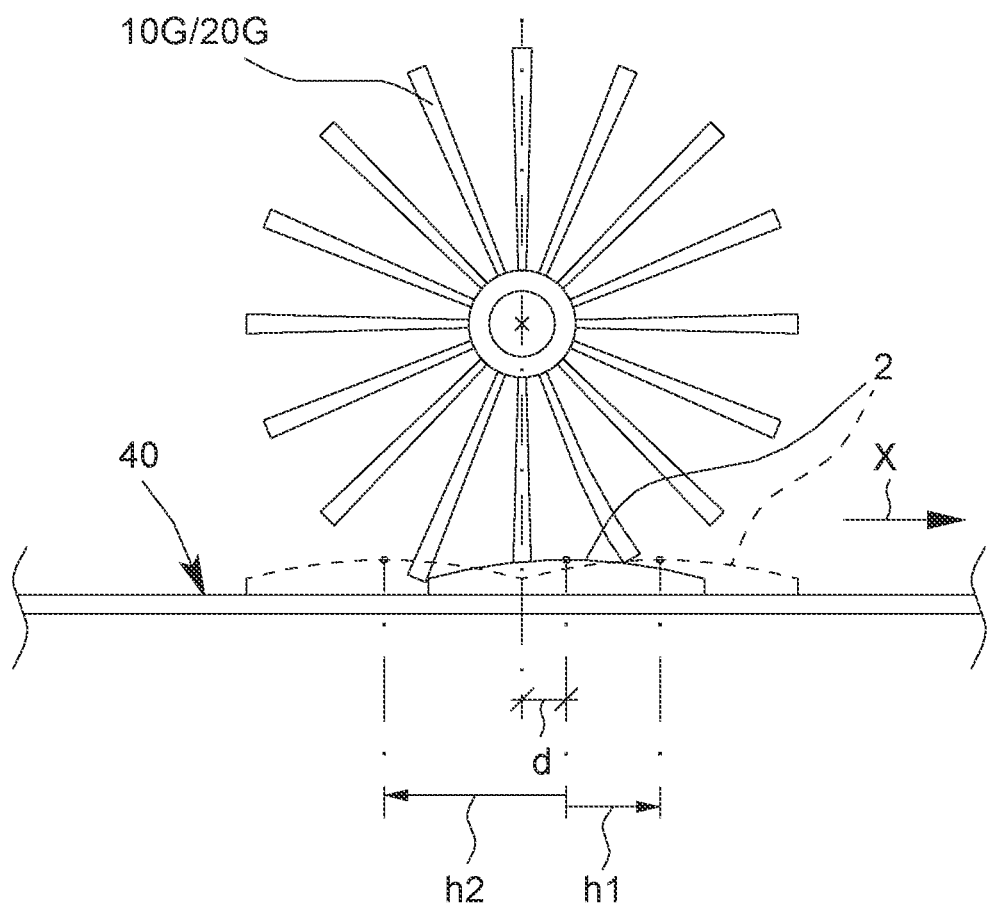
FIG. 10 a schematic representation of the lens during a cleaning process.

FIG. 10 shows a schematic view of the lens 2 in a starting or cleaning position and/or during the cleaning process, with only the upper brush 10G shown for simplicity.

Preferably, the conveying device 40 is stopped (briefly) when the lens 2 reaches the starting or cleaning position in the cleaning area 10B.

It is optionally provided that the lens 2 is positioned horizontally offset to the brushes 10G, in particular by an offset d, especially preferably in the conveying direction and/or with respect to its center relative to the brush axis. The offset d depends in particular on the lens diameter and/or on the prepositioning.

In the case of an offset d, the center of the lens 2 is then not aligned perpendicularly to the axes of rotation of the brushes 10G in the starting or cleaning position or at the beginning of the cleaning process.

Preferably, the brush drives 10K are only activated and/or the brushes 10G are only set in motion when the starting or cleaning position has been reached.

In this way, the wear of the brushes 10G caused in particular by the contact of the brushes 10G with the edge of the lens 2 is reduced.

In the method according to the proposal, it is provided that during the cleaning process, the lens 2 is moved back and forth and/or is moved in the conveying direction X and against the conveying direction X several times, in particular at least twice or three times, and/or that the conveying device 40, in particular the chain strand 40A/40B or the upper run 40H, moves or oscillates the lens 2 horizontally and/or parallel to the conveying direction X accordingly. In this way, a particularly thorough and intensive cleaning of the lens 2 is made possible in the respective cleaning station 10/20/30.

The cleaning process or the oscillation of the lens 2 by the conveying device 40 preferably takes more than five seconds or ten seconds, in particular more than 15 seconds, and/or less than 60 seconds or 40 seconds, in particular less than 25 seconds.

In particular, in order to clean the lens 2 uniformly despite the offset d, the lens 2 is preferably first moved forward and backward by different distances in the conveying direction X and against the conveying direction X, starting from the starting or cleaning position.

Preferably, during the cleaning process, the lens 2 is first moved in the conveying direction X by the forward travel h1 and against the conveying direction X by the backward travel h2, preferably with the forward travel h1 being smaller than the backward travel h2. However, the reverse case is also possible. In addition, h1 and h2 can also be of equal magnitude, in particular if there is no offset d.

Preferably, the conveying device 40 is stopped (again) after completion of the cleaning process, in particular in such a way that the lens 2 is (again) in the starting or cleaning position. However, this is only optional.

Subsequently, the brush drives 10K are preferably stopped, preferably with the pump 10U continuing to run and/or being deactivated only after the brush drives 10K have been deactivated.

Preferably, the (pre-cleaned) lens 2 is subsequently or after the (first) cleaning process in a further or fifth method step conveyed in conveying direction X by means of the conveying device 40 out of the cleaning station 10 through the further opening 5A and optional brush seals 5B and/or fed to the further or second cleaning station 20, in particular in order to perform a (second) cleaning process and/or to rinse the lens 2.

In particular, the method sequence or cleaning sequence in the second cleaning station 20 corresponds to the sequence in the first cleaning station 10, wherein, however, a different cleaning agent, in particular demineralized and/or deionized water, is preferably used for rinsing or otherwise cleaning the lens 2.

Since the conveying device 40 moves all lenses 2 located on the conveying device 40 in the same way, a simultaneous oscillation of all lenses 2 in the various cleaning stations also takes place, so that this central manipulation or control leads in a very simple way to an optimized cleaning in the respective cleaning stations. The lens 2 is thus also moved back and forth or oscillated accordingly during cleaning in the second cleaning station 20 and also in the further cleaning stations.

In a further or sixth method step, the lens 2 or the carrier 40C with the lens 2 is fed by means of the conveying device 40 through the next opening 5A and optional brush seal 5B to the third cleaning station 30, where it is preferably rinsed and/or dried (again).

It is preferably provided that the (cleaned) lens 2 is rinsed with cleaning agent (preferably pure and/or deionized water) in the third cleaning station 30, in particular in the cleaning area 30B, particularly preferably immediately after entering the cleaning area 30B of the third cleaning station 30, preferably by means of the nozzles 30H.

For the rinsing process, the conveying speed of the conveying device 40 is preferably reduced.

As already explained, it is provided that for rinsing the lens 2 or for the rinsing process, the cleaning agent is pumped from the collecting area 30C of the third cleaning station 30 into the cleaning area 30B, in particular via the filter device 30R and the nozzles 30H.

The cleaning agent used for rinsing in the third cleaning area 30B is preferably not fed back into the collecting area 30C of the third cleaning station 30 (so that the cleaning agent there is not contaminated), but is fed to the second cleaning station 20 or its collecting area 20C in particular via the collecting area 20B, in particular via the connection opening 30V. In this way, it is ensured that highly pure and/or uncontaminated and/or only unused cleaning agent is used for the cleaning process or (final) rinsing process in the third cleaning station 30.

In addition, the discharge of the cleaning agent used for rinsing from the third cleaning station 30 into the second cleaning station 20 can counteract undesirable contamination of the cleaning agent of the second cleaning station 20 by carryover of cleaning agent and contaminants from the first cleaning station 10 into the second cleaning station 20, especially since the cleaning agent discharged from the third cleaning station 30 is still relatively pure or uncontaminated even after rinsing and ideally contains hardly any residues of the cleaning agent of the first cleaning station 10.

Since the collecting area 30C of the third cleaning station 30 therefore empties over time and the collecting area 20C of the second cleaning station 20 fills up, the third cleaning station 30 preferably has an inflow via which (fresh) cleaning agent is pumped or can flow into the collecting area 30C when the filling level of the collecting area 30C reaches a lower limit value. In a corresponding manner, the collecting area 20C of the second cleaning station 20 preferably has a drain via which the cleaning agent can be pumped out or can flow out when the filling level of the collecting area 20C reaches an upper limit value.

In a further or seventh method step, the lens 2 is dried, in particular by means of the blower 30J, preferably with the lens 2 being moved back and forth or oscillated in a corresponding manner, as already explained.

In this way, particularly fast and efficient drying of the lens 2 is made possible.

In a further or eighth method step, the (cleaned and/or dried) lens 2 is fed to the unloading station 60 by means of the conveying device 40 in conveying direction X. In the unloading station 60 or in the unloading position, which is preferably at least partially enclosed by the housing 5 or another housing, the lens 2 can optionally be subjected to a further cleaning process by means of the blower 60F, namely (additionally) be dried by means of the blower 60F or the like. This (additional) drying step is optional.

Subsequently, the carrier 40C or the clamping of the lens 2 on the carrier 40C is opened (by means of the associated actuator 40P).

Then, in the next step, the lens 2 can be picked up by the handling device 60A of the unloading station 60 and (re) transferred to the transport carrier 6 on the transport belt 3.

Preferably, the handling device 60A, in particular the gripping device 60B, is positioned above the lens 2 or the carrier 40C with the lens 2 for this purpose, and the lens 2 is removed from the carrier 40C at the edge by means of the gripping device 60B.

The gripping device 60B is preferably moved along the rail 60D by means of the carriage 60E. When the gripping device 60B with the lens 2 is above the transport belt 3, the gripping device 60B is moved vertically and/or lowered in the direction of the transport belt 3 and the lens 2 is delivered to the transport carrier 6.

Preferably, the conveying device 40 is stopped for loading and/or unloading, in particular in such a way that the conveying device 40 stands still temporarily during the transfer of the lens 2.

In the method according to the proposal, it is preferably provided that the conveying speed of the conveying device 40 is changed simultaneously for all cleaning stations, in particular as a function of the method steps.

Preferably, the conveying device 40 is stopped for loading and unloading and/or the conveying speed of the conveying device 40 is reduced and/or reversed for the cleaning processes.

As already explained, it is in particular intended to reverse the conveying direction X at least temporarily during the cleaning processes and/or to move back and forth or oscillate the lens 2 in the cleaning areas 10B/20B/30B/60B and/or between the brushes 10G/20G, the nozzles 10H/20H/ 30H and/or the blowers 30J/60F, i.e. simultaneously in all cleaning stations.

As already explained at the beginning, several lenses 2, in particular several lens pairs, are preferably cleaned simultaneously or in parallel. Thus, a lens 2 or a lens par in the first cleaning station 10, a lens 2 or a lens par in the second cleaning station 20, a lens 2 or a lens par in the third cleaning station 30, and a lens 2 or a lens par in the fourth cleaning station (here the unloading area) can be cleaned simultaneously or in parallel, preferably wherein the conveying device 40 in the loading station 50 is loaded simultaneously with a further lens 2 or a further lens pair and/or a (cleaned and/or dried) lens 2 or a (cleaned and/or dried) lens pair can be removed from the conveying device 40 in the unloading station 60.

In this way, a particularly high throughput, in particular of more than 100 or 200 spectacle lenses per hour, is possible.

Individual aspects, features and method steps of the present invention can be implemented independently, but also in any combination and/or sequence.

| List of reference signs: | |
|---|---|
| 1 | Cleaning machine |
| 2 | Lens |
| 3 | Transport belt |
| 4 | Control device |
| 5 | Housing |
| 5A | Opening |

| List of reference signs: | |
|---|---|
| 5B | Brush seal |
| 5C | Partition |
| 6 | Transport carrier |
| 10 | First cleaning station |
| 10A | Cleaning chamber |
| 10B | Cleaning area |
| 10C | Collection area |
| 10D | Intermediate floor |
| 10E | Passage |
| 10F | Holder |
| 10G | Brush |
| 10H | Nozzle |
| 10K | Brush drive |
| 10N | Heating device |
| 10P | Temperature sensor |
| 10Q | Filling level sensor |
| 10R | Filter device |
| 10U | Pump |
| 10W | Maintenance opening |
| 20 | Second cleaning station |
| 20A | Cleaning chamber |
| 20B | Cleaning area |
| 20C | Collection area |
| 20D | Intermediate floor |
| 20E | Passage |
| 20F | Holder |
| 20G | Brush |
| 20H | Nozzle |
| 20K | Brush drive |
| 20N | Heating device |
| 20P | Temperature sensor |
| 20Q | Level sensor |
| 20R | Filter device |
| 20S | Inlet |
| 20T | Outlet |
| 20U | Pump |
| 20W | Maintenance opening |
| 30 | Third cleaning station |
| 30A | Cleaning chamber |
| 30B | Cleaning area |
| 30C | Collection area |
| 30D | Intermediate floor |
| 30G | Brush |
| 30H | Nozzle |
| 30J | Blower |
| 30N | Heating device |
| 30P | Temperature sensor |
| 30Q | Filling level sensor |
| 30R | Filter device |
| 30S | Inlet |
| 30T | Outlet |
| 30V | Connection opening |
| 30U | Pump |
| 30W | Maintenance opening |
| 40 | Conveying device |
| 40A | first chain strand |
| 40B | second chain strand |
| 40C | Carrier |
| 40D | Drive wheel |
| 40E | Driven wheel |
| 40F | First idler wheel |
| 40G | Second idler wheel |
| 40H | Upper run |
| 40J | Lower run |
| 40K | Coupling |
| 40L | Holding section |
| 40M | Swivel arm |
| 40N | Holding pin |
| 40P | Actuator |
| 40Q | Drive |
| 40R | Guide rail |
| 50 | Loading station |
| 50A | Handling device |
| 50B | First gripping device |
| 50C | Second gripping device |
| 50D | Rail |
| 50E | Sledge |
| 50F | Prepositioning unit |
| 50G | Holder |
| 50H | Jaw |
| 50J | Guide |
| 50K | Carriage guide |
| 60 | Unloading station |
| 60A | Handling device |
| 60B | Gripping device |
| 60D | Rail |
| 60E | Carriage |
| 60F | Blower |
| X | Conveying direction |
| d | Offset |
| h1 | Forward travel |
| h2 | Backward travel |

What is claimed is:

1. A cleaning machine configured to clean a lens comprising:
    at least one cleaning station,
    wherein
    the cleaning machine has a conveying device that is configured to convey the lens through the at least one cleaning station in a conveying direction, wherein the conveying device is an endless conveyor that conveys through a plurality of cleaning stations, and wherein the conveying device moves back and forth during one or each cleaning process simultaneously in the cleaning stations.

2. The cleaning machine according to claim 1, wherein the conveying device provides multiple and/or horizontal oscillation of the lens parallel to the conveying direction during cleaning.

3. The cleaning machine according to claim 1, wherein the conveying device is a linear and/or chain conveyor.

4. The cleaning machine according to claim 1, wherein the cleaning machine has a plurality of cleaning stations, and
    wherein the cleaning stations are arranged directly next to one another and/or one behind the other in the conveying direction and/or the conveying device or an upper run of the conveying device runs horizontally through all the cleaning stations.

5. The cleaning machine according to claim 1, wherein the cleaning machine comprises a loading station configured to load the conveying device and/or an unloading station for unloading the conveying device.

6. The cleaning machine according to claim 5, wherein the loading station has a handling device configured to handle the lens, the handling device having at least one gripping device for the lens.

7. The cleaning machine according to claim 5, wherein the cleaning machine or the loading station comprises a prepositioning unit configured to align the lens.

8. The cleaning machine according to claim 7, wherein the prepositioning unit comprises a holder and a jaw, wherein the holder and the jaw are displaceable relative to each other.

9. The cleaning machine according to claim 5, wherein the unloading station has a handling device configured to handle the lens, the handling device having a gripping device for the lens.

* * * * *